United States Patent
Gocke et al.

(10) Patent No.: US 11,465,119 B2
(45) Date of Patent: Oct. 11, 2022

(54) PLANAR CATALYST FILLING

(71) Applicant: ALANTUM EUROPE GMBH, Munich (DE)

(72) Inventors: Ulla Gocke, Brunnthal (DE); Robin Kolvenbach, Munich (DE); Anke Scheiblhuber, Munich (DE); Lars Torkuhl, Munich (DE)

(73) Assignee: ALANTUM EUROPE GMBH, Munich (DE)

(*) Notice: Subject to any disclaimer, the term of this patent is extended or adjusted under 35 U.S.C. 154(b) by 696 days.

(21) Appl. No.: 16/313,343

(22) PCT Filed: Jun. 14, 2017

(86) PCT No.: PCT/EP2017/064573
§ 371 (c)(1),
(2) Date: Dec. 26, 2018

(87) PCT Pub. No.: WO2018/001740
PCT Pub. Date: Jan. 4, 2018

(65) Prior Publication Data
US 2019/0151820 A1    May 23, 2019

(30) Foreign Application Priority Data

Jun. 27, 2016 (EP) .................................. 16176411

(51) Int. Cl.
*B01J 19/32* (2006.01)
*B01J 35/04* (2006.01)
*B01J 35/02* (2006.01)

(52) U.S. Cl.
CPC ............... *B01J 19/32* (2013.01); *B01J 35/02* (2013.01); *B01J 35/04* (2013.01);
(Continued)

(58) Field of Classification Search
None
See application file for complete search history.

(56) References Cited

U.S. PATENT DOCUMENTS 4,351,887 A * 9/1982 Bishop ............... C01B 21/267
                                                    428/594
4,743,578 A    5/1988 Davidson
(Continued)

FOREIGN PATENT DOCUMENTS

CN         2426763 Y    4/2001
CN      101360557 A    2/2009
(Continued)

OTHER PUBLICATIONS

English Translation of International Search Report for International Application No. PCT/EP2017/064573 dated Aug. 8, 2017; 2 pages.
(Continued)

*Primary Examiner* — Jennifer A Leung
(74) *Attorney, Agent, or Firm* — Dickinson Wright PLLC

(57) ABSTRACT

The invention relates to a catalyst filling, comprising a first layer of a planar catalyst material and a second layer of a planar catalyst material lying over said first layer, wherein the catalyst material of the first layer comprises at least two plates, which butt against each other to form an abutment edge in each case, wherein the catalyst material of the second layer comprises at least two plates, which butt against each other to form an abutment edge in each case, and wherein the plates of the second layer are designed and/or arranged relative to the plates of the first layer in such a way that the abutment edge or abutment edges of the second layer are not aligned with the abutment edge or abutment edges of the first layer.

18 Claims, 22 Drawing Sheets

Figure 1:
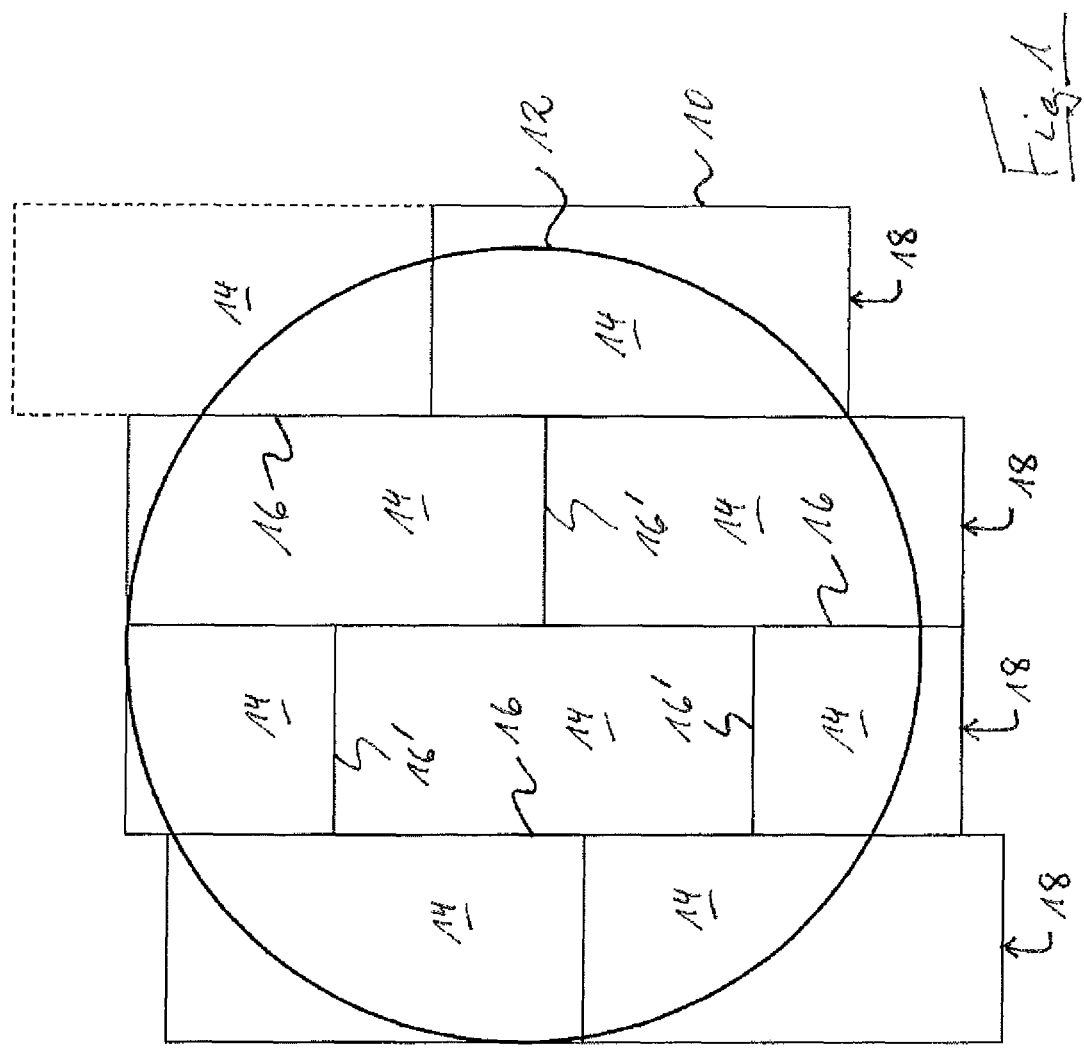

(52) U.S. Cl.
CPC .............. *B01J 2219/3085* (2013.01); *B01J 2219/30234* (2013.01); *B01J 2219/30246* (2013.01); *B01J 2219/30475* (2013.01); *B01J 2219/3222* (2013.01); *B01J 2219/32206* (2013.01); *B01J 2219/32227* (2013.01); *B01J 2219/32466* (2013.01)

(56) References Cited

U.S. PATENT DOCUMENTS

| | | | | |
|---|---|---|---|---|
| 5,997,173 | A * | 12/1999 | Ingram | B01J 19/32 366/337 |
| 6,119,481 | A | 9/2000 | Sunder | |
| 7,109,388 | B2 * | 9/2006 | Brocker | B01J 19/32 422/211 |
| 8,002,856 | B2 * | 8/2011 | Williams | B01J 23/8926 48/197 R |

FOREIGN PATENT DOCUMENTS

| | | |
|---|---|---|
| CN | 201260963 Y | 6/2009 |
| DE | 343400 C | 11/1921 |
| EP | 0930096 A2 | 7/1999 |
| EP | 1973649 B1 | 6/2009 |
| WO | 2007083077 A1 | 7/2007 |

OTHER PUBLICATIONS

English Translation of Written Opinion for International Application No. PCT/EP2017/064573 dated Aug. 8, 2017; 5 pages.
Second Chinese Office Action with English translation dated Mar. 25, 2021 for Chinese Application No. 201780038991.4, 11 pages.
Zhang Hongqiong, "New Material That Changes the World" with English abstract, 2013, ISBN: 978-7-5398-4237-0, 6 pages.

* cited by examiner

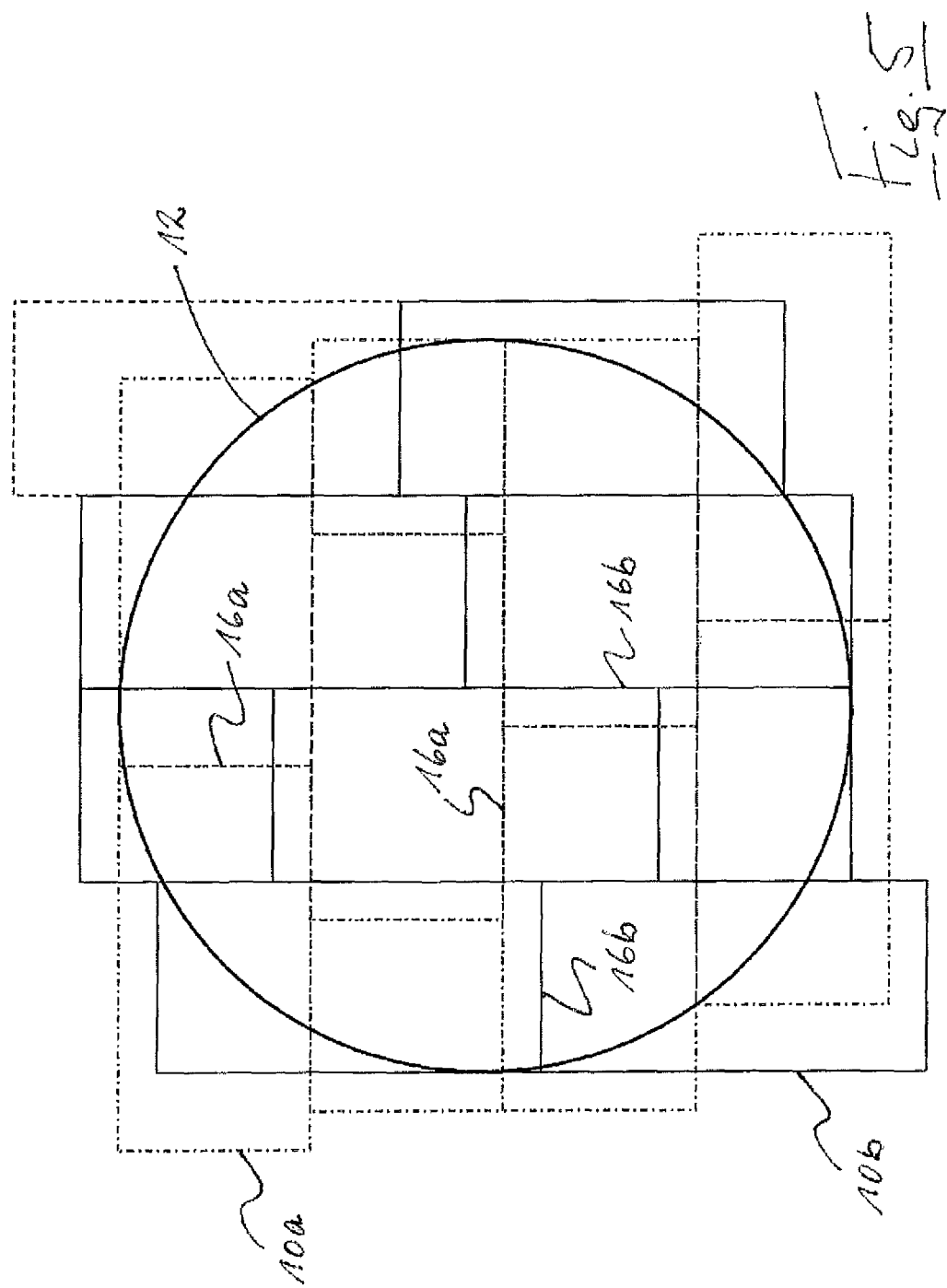

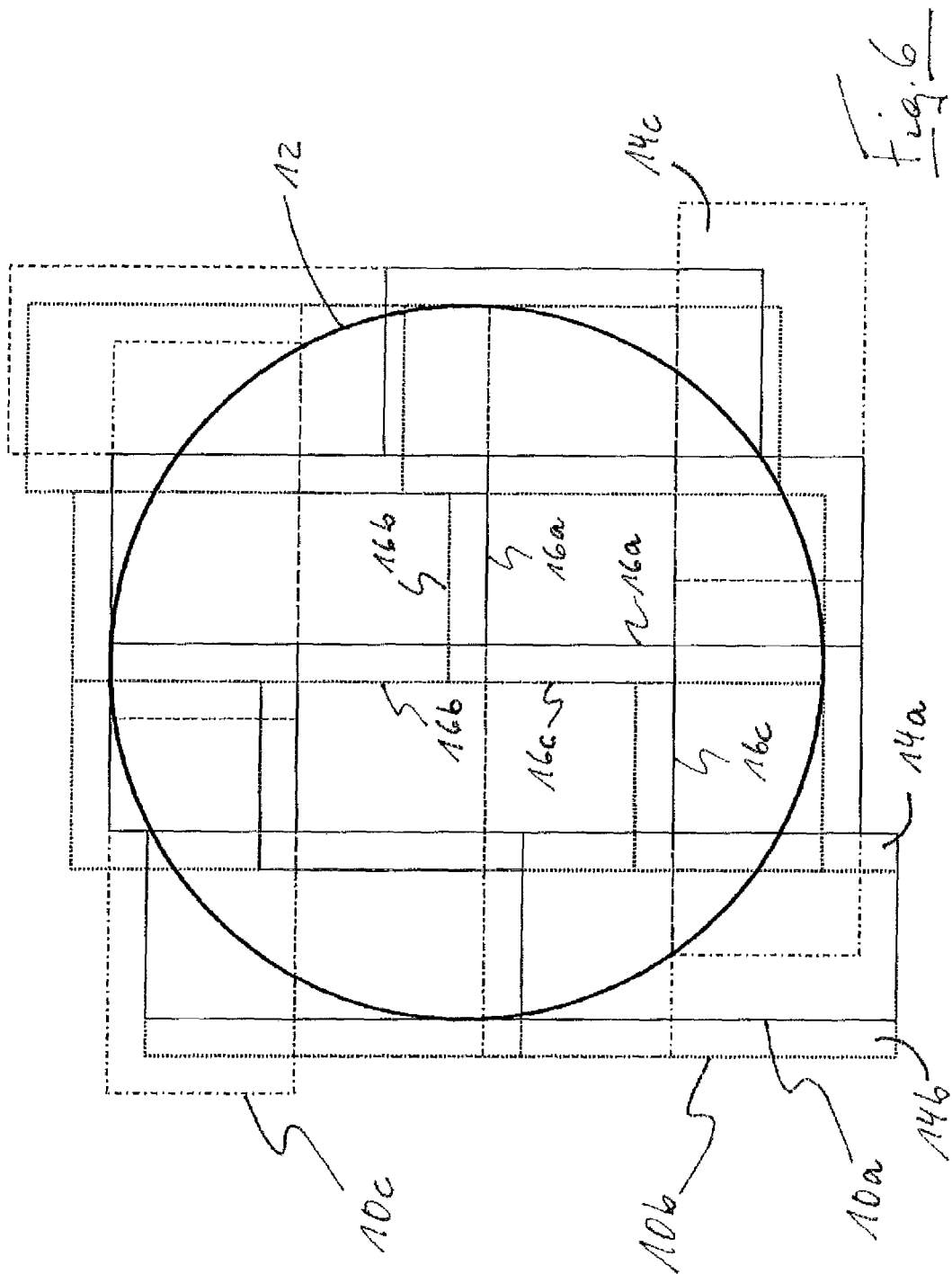

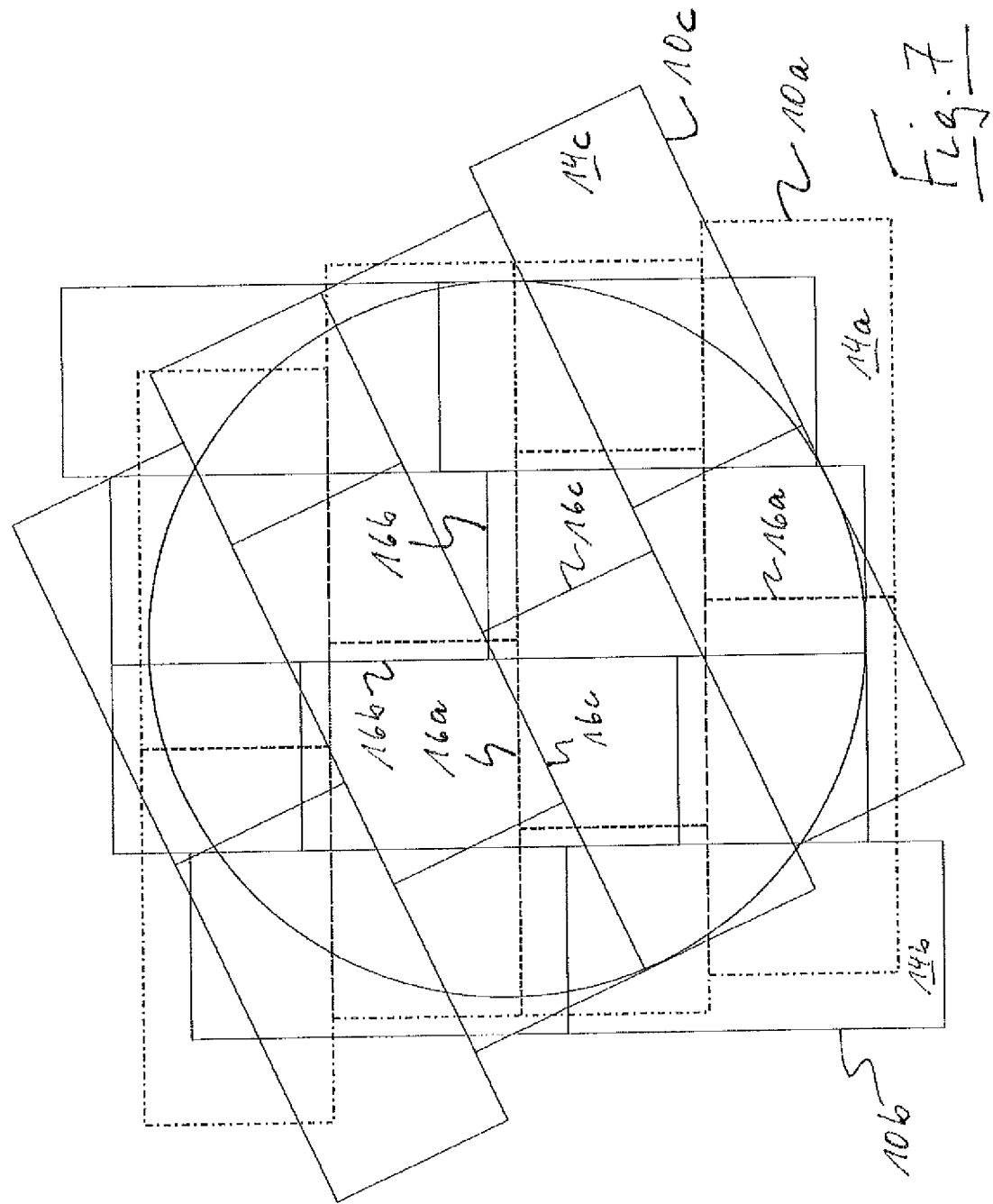

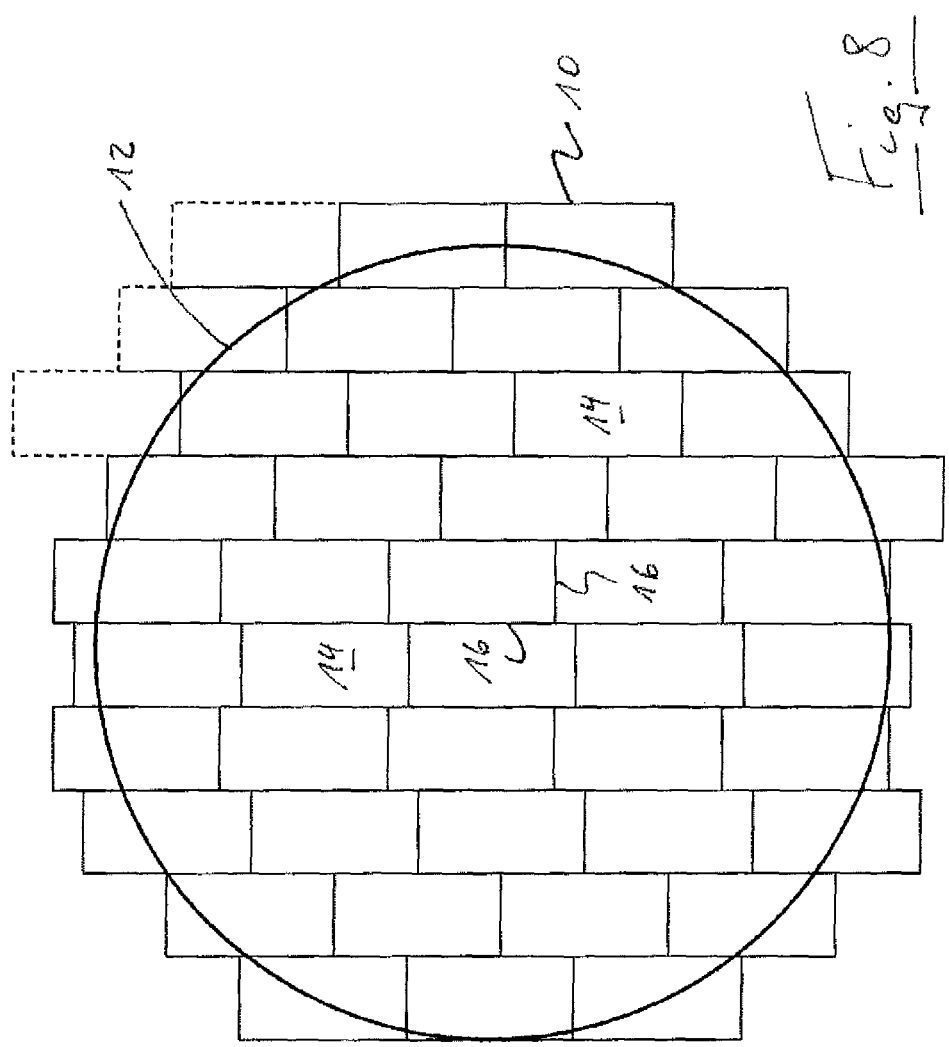

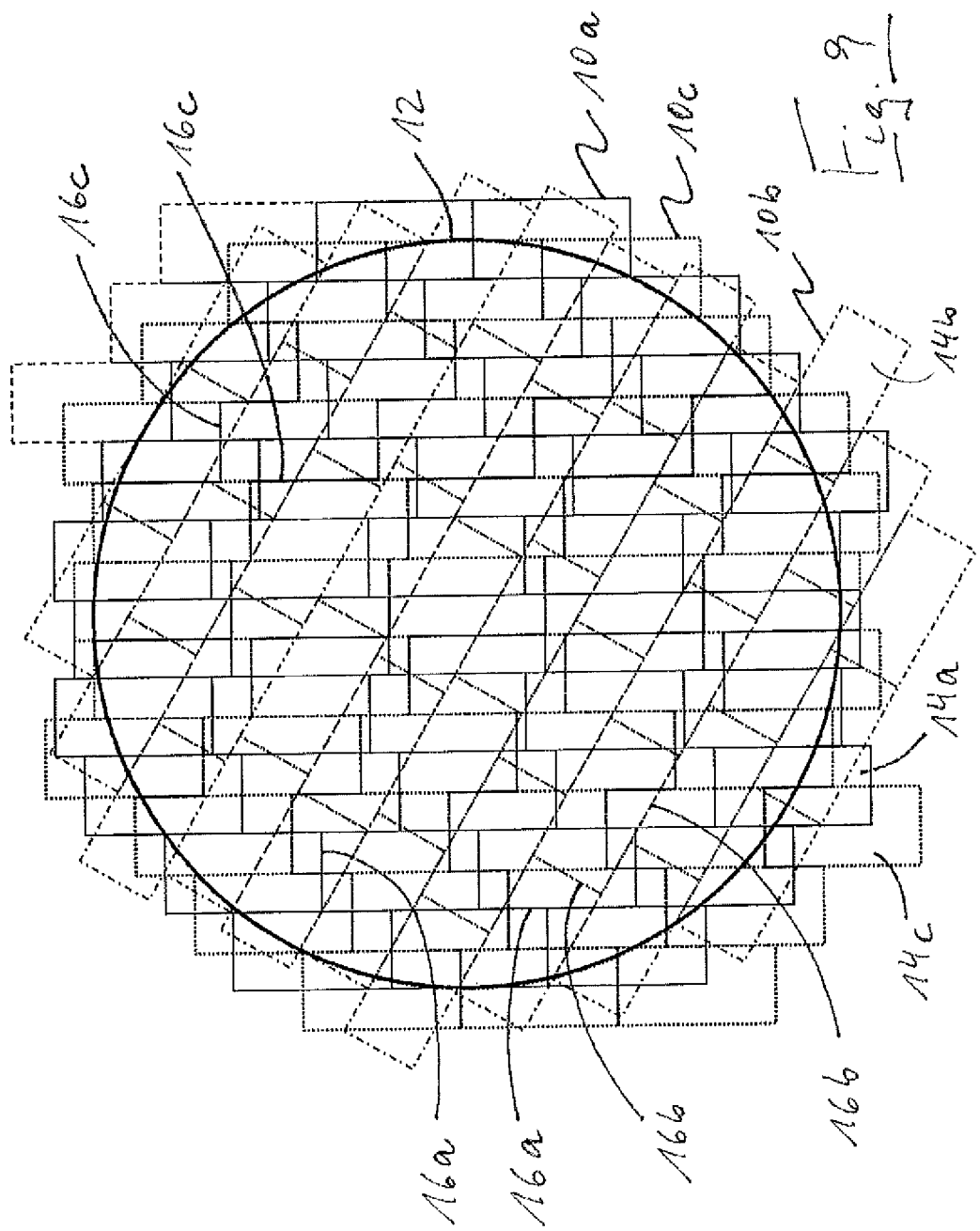

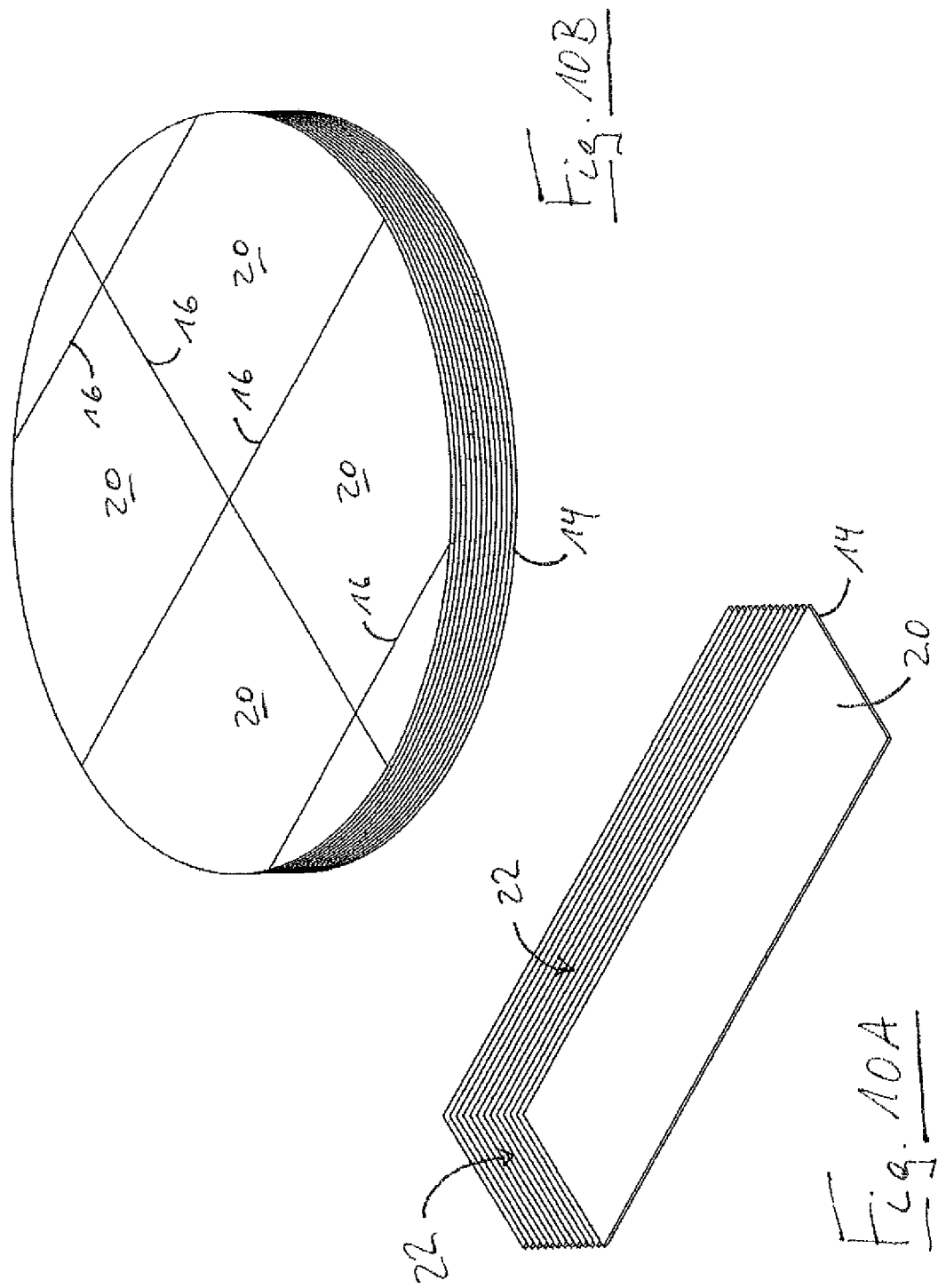

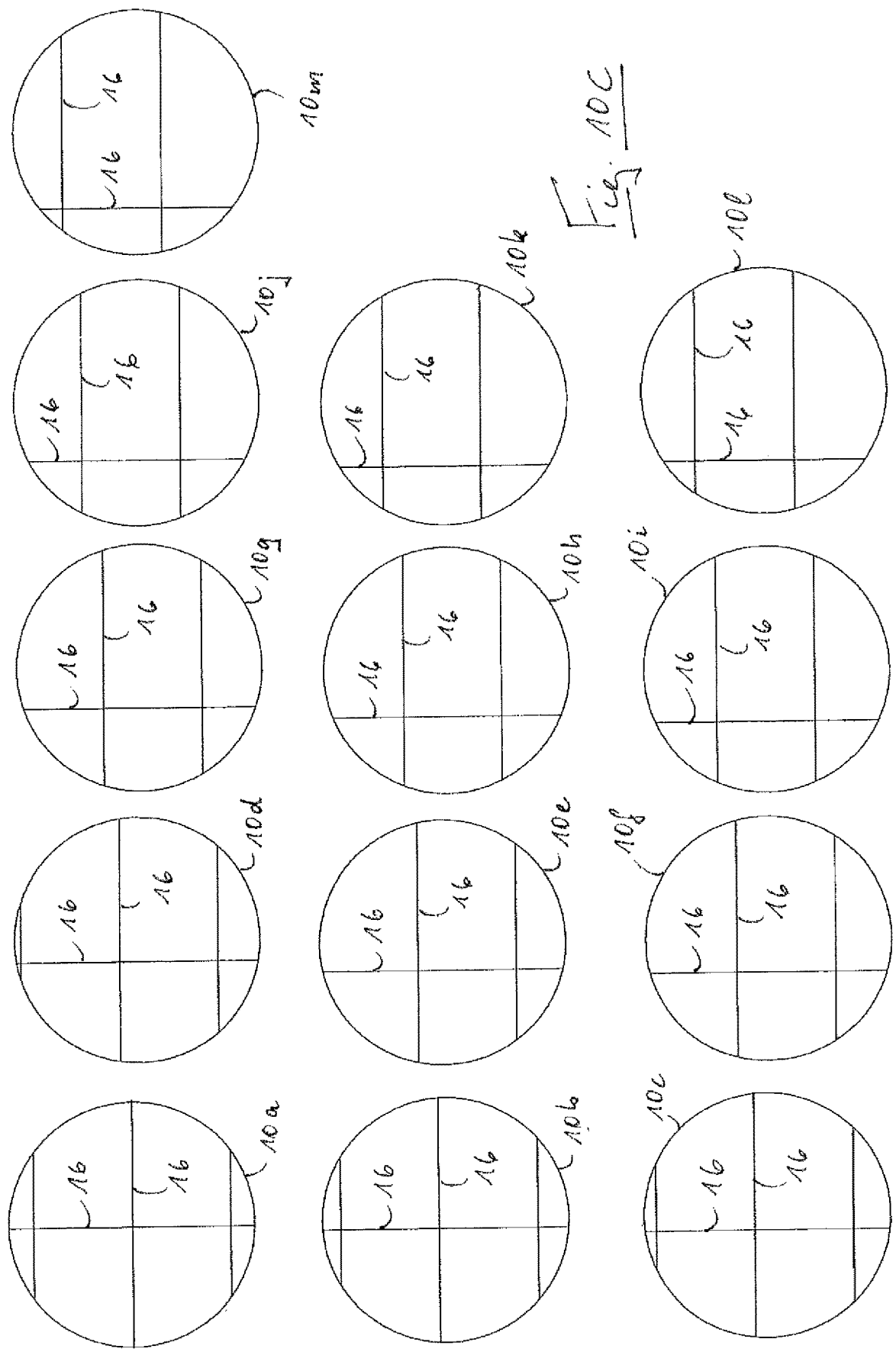

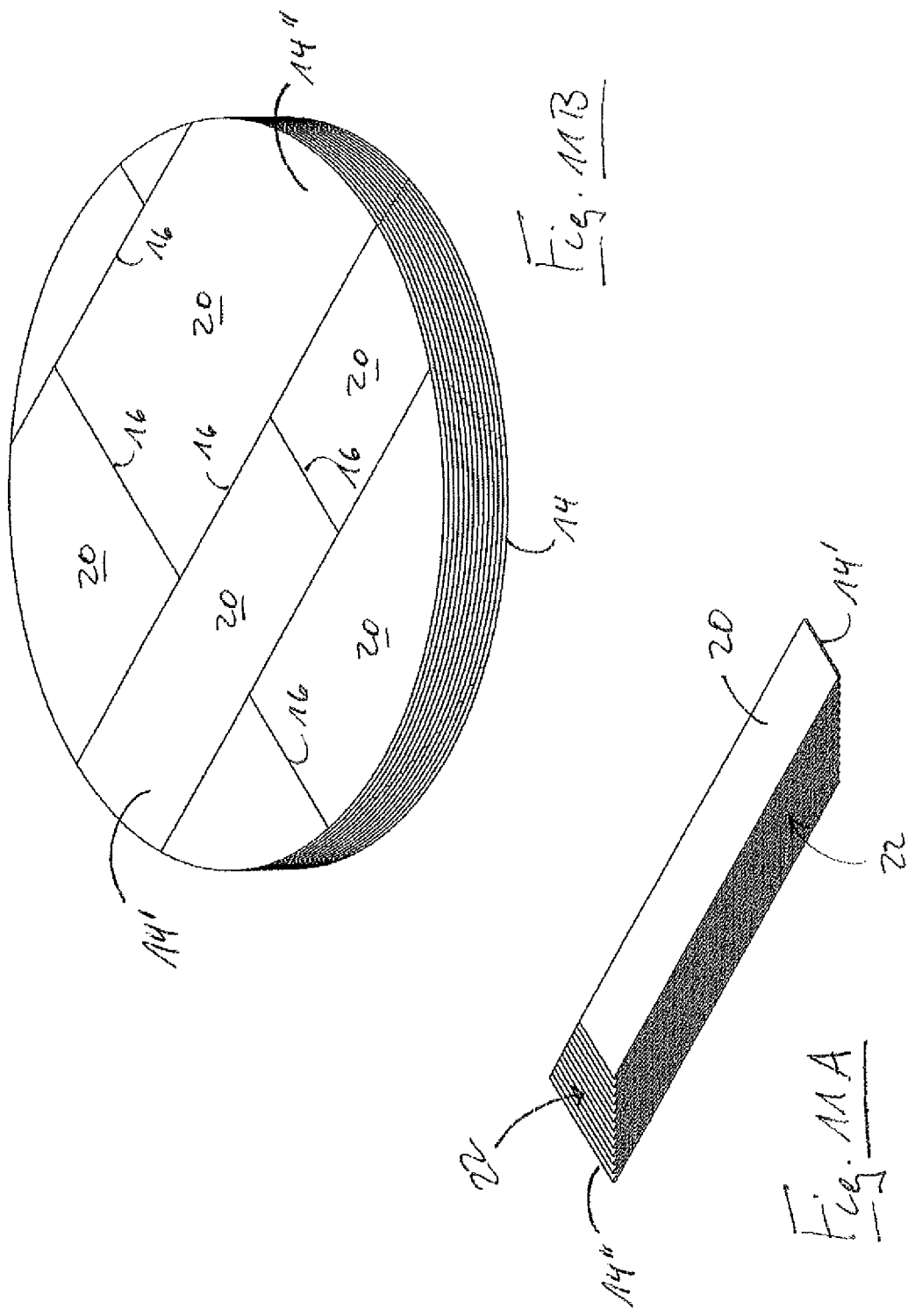

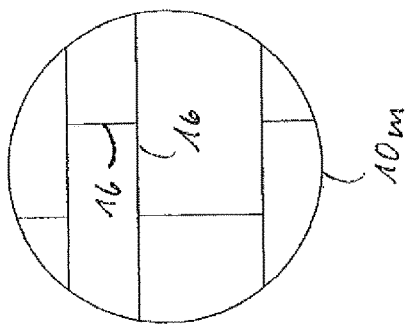
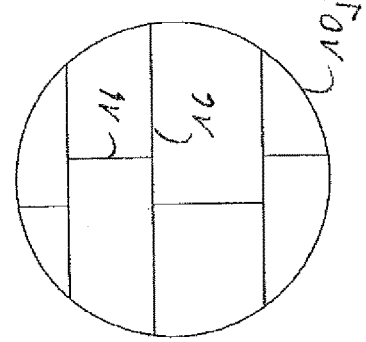
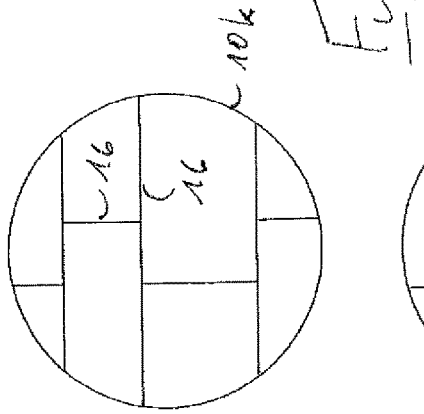
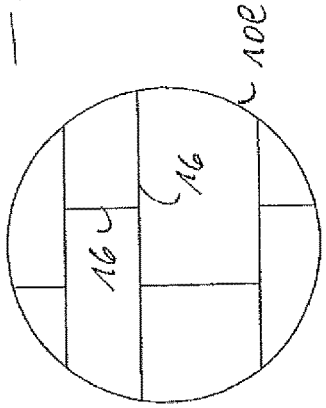
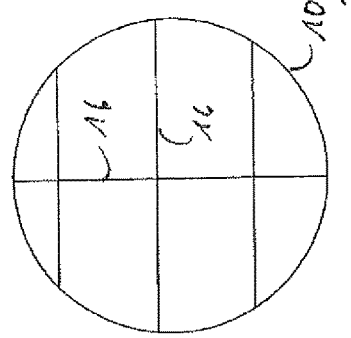
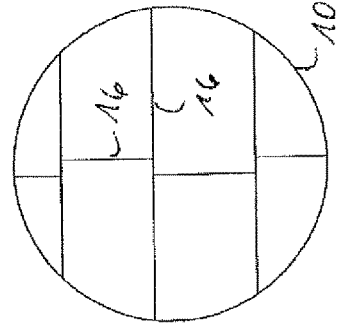
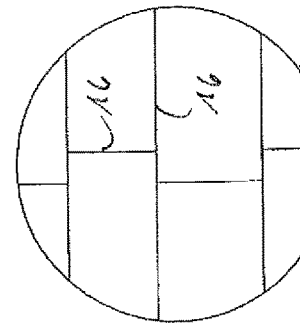
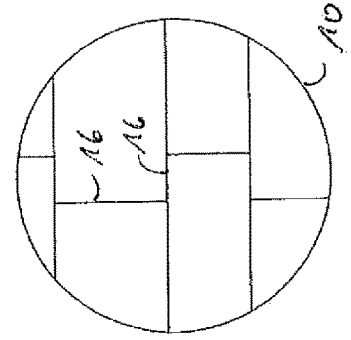
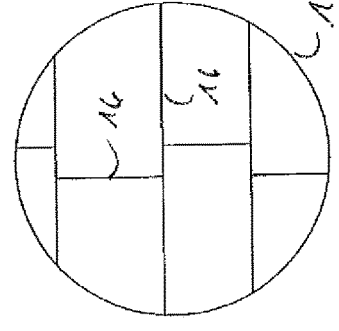
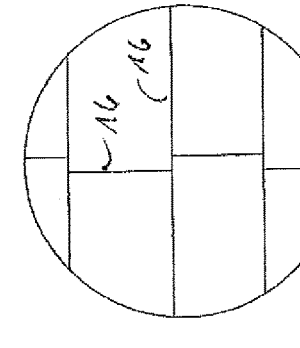
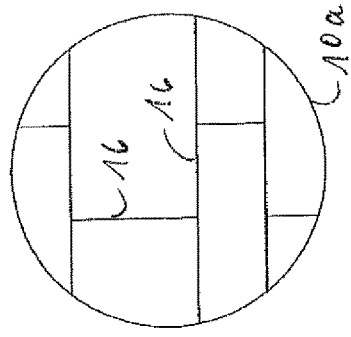
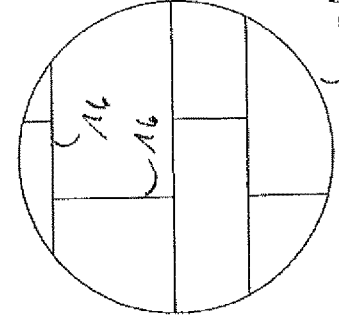
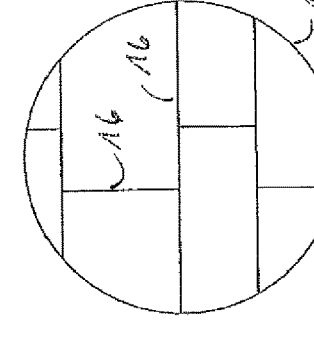
Fig. 11C

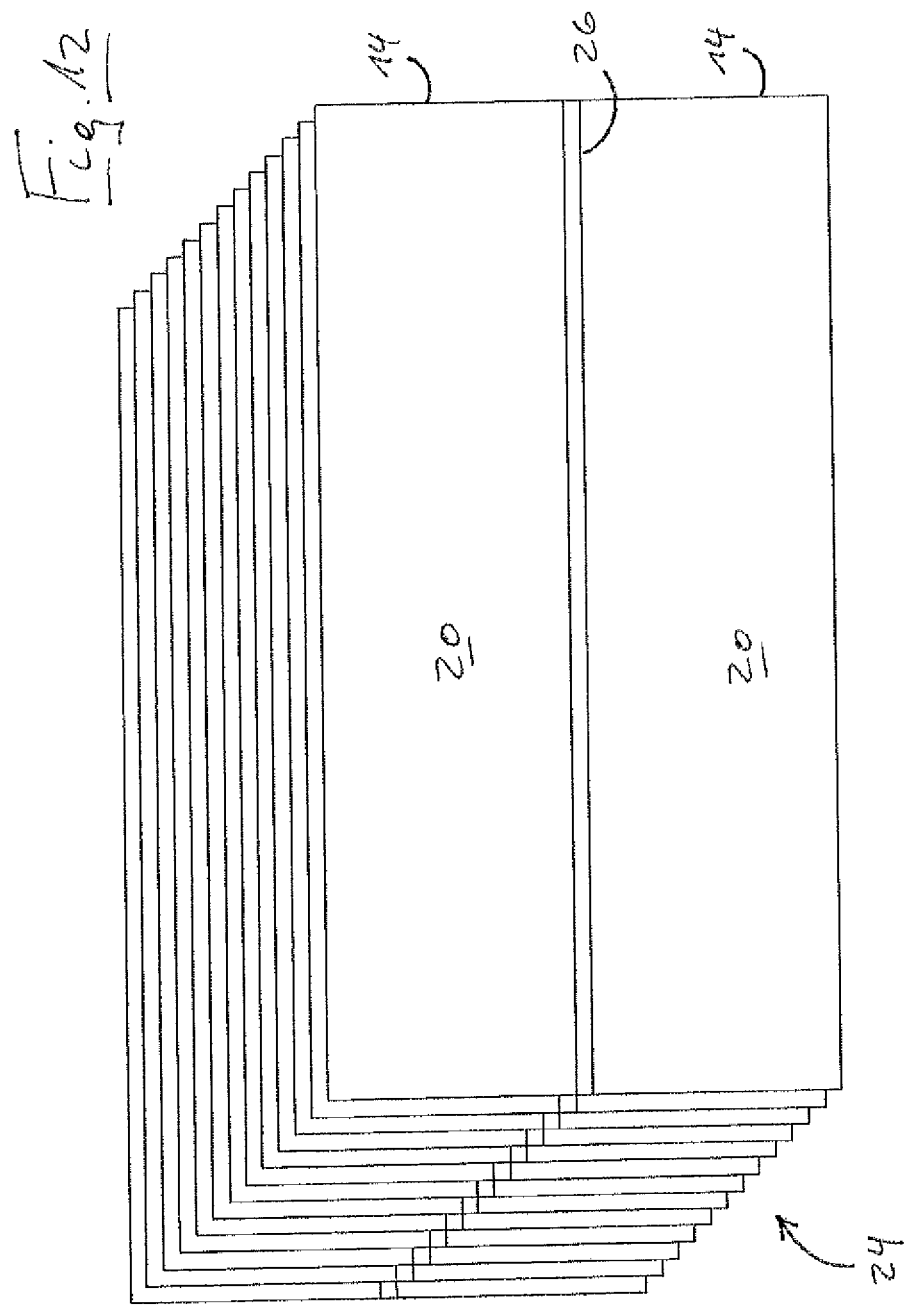

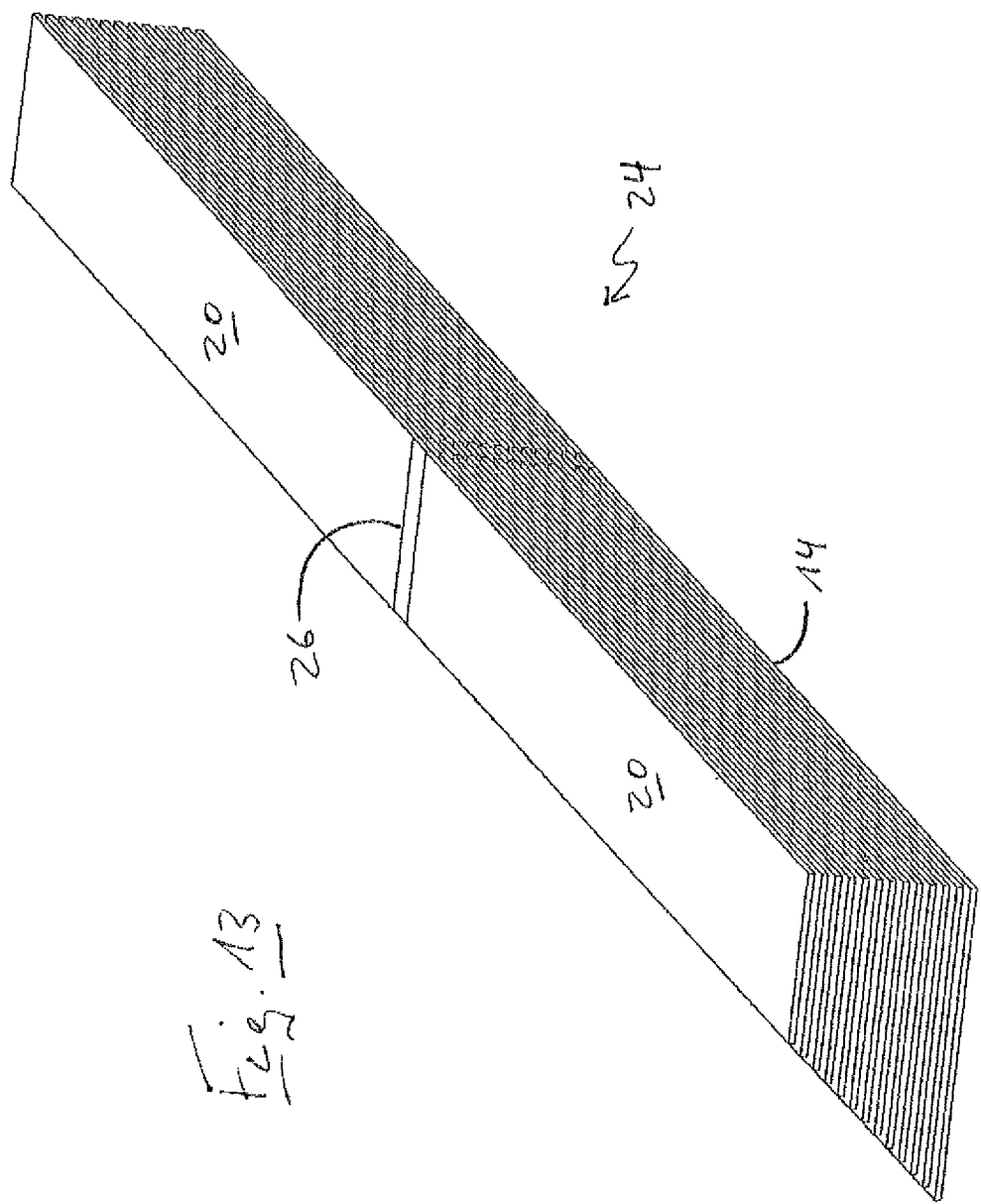

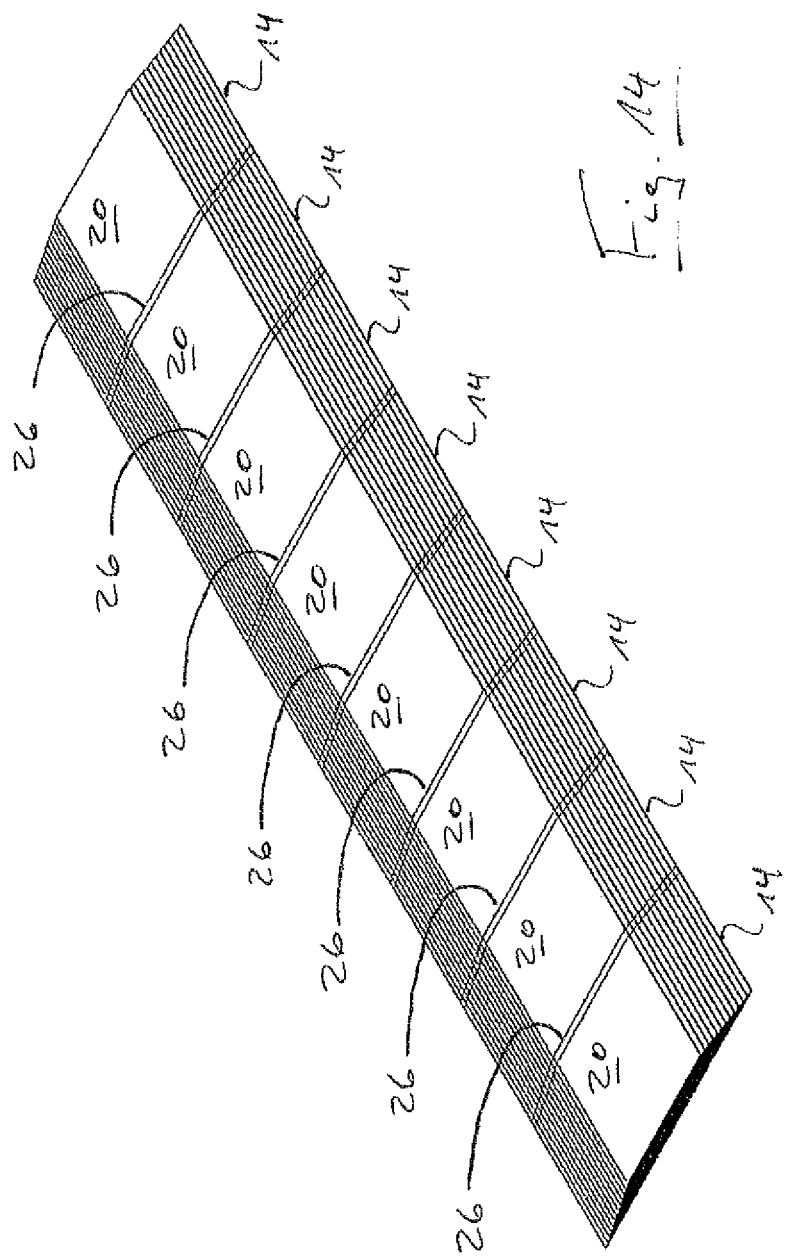

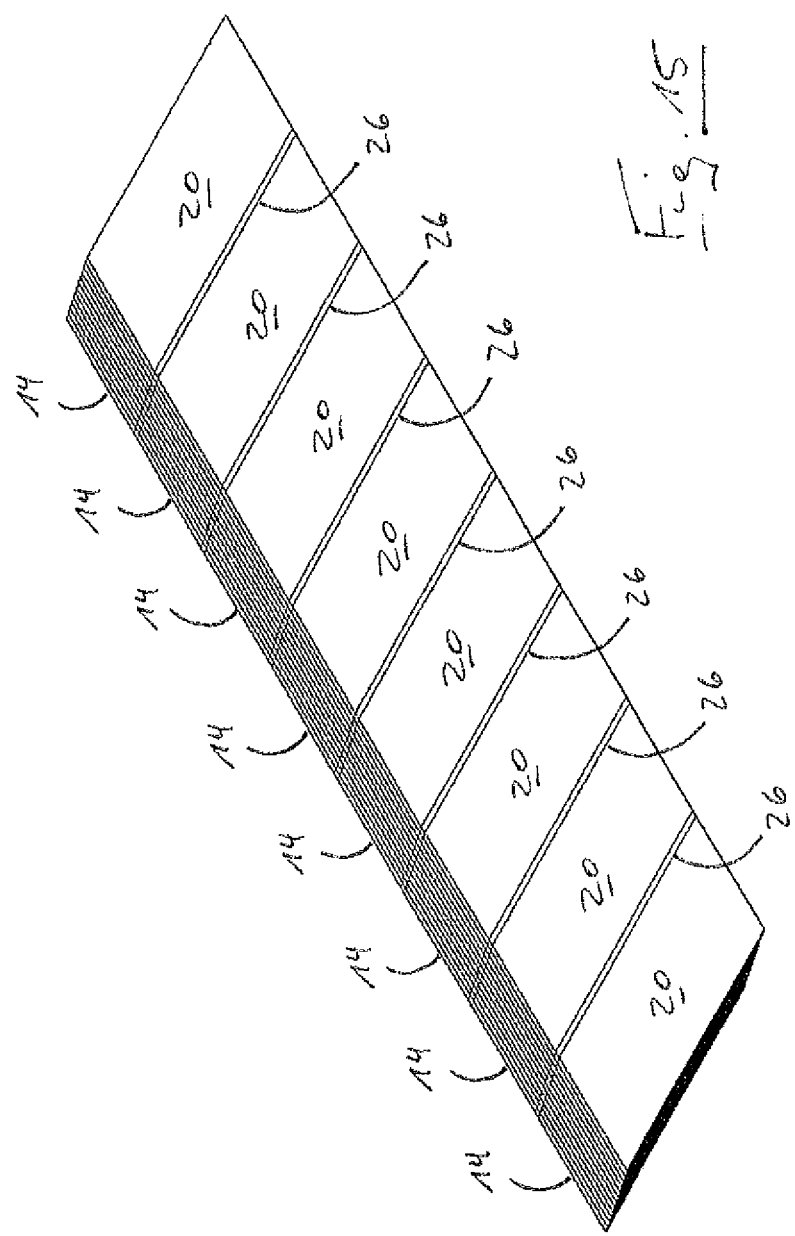

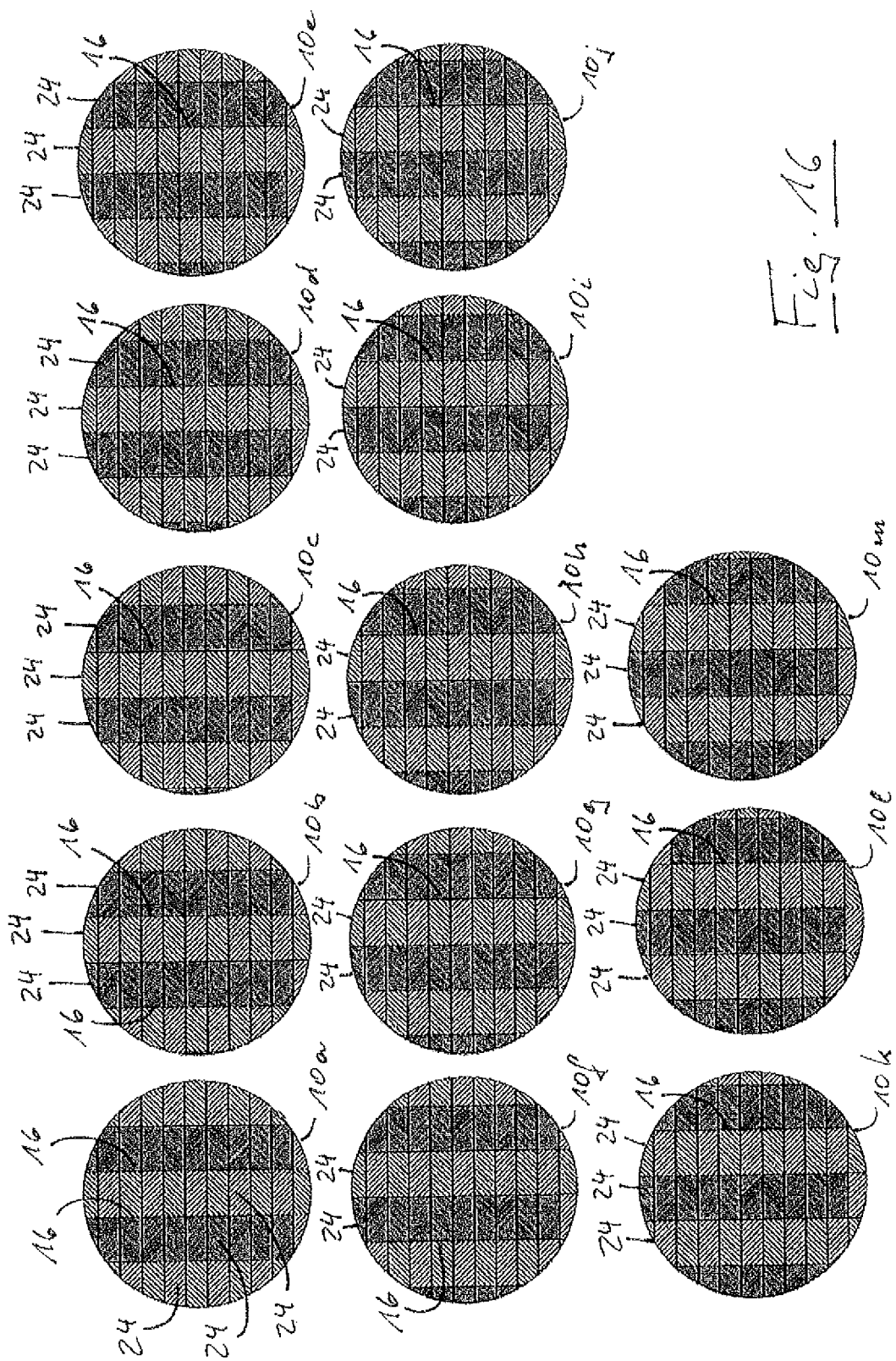

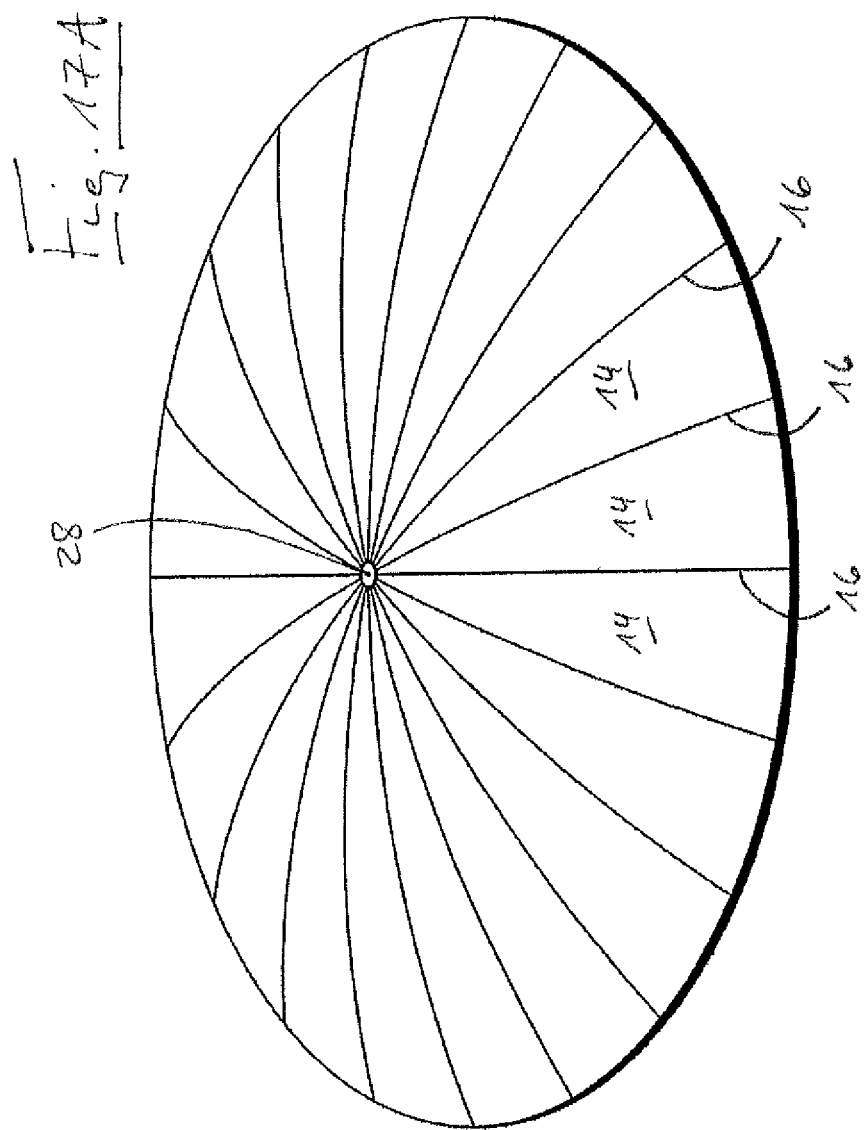

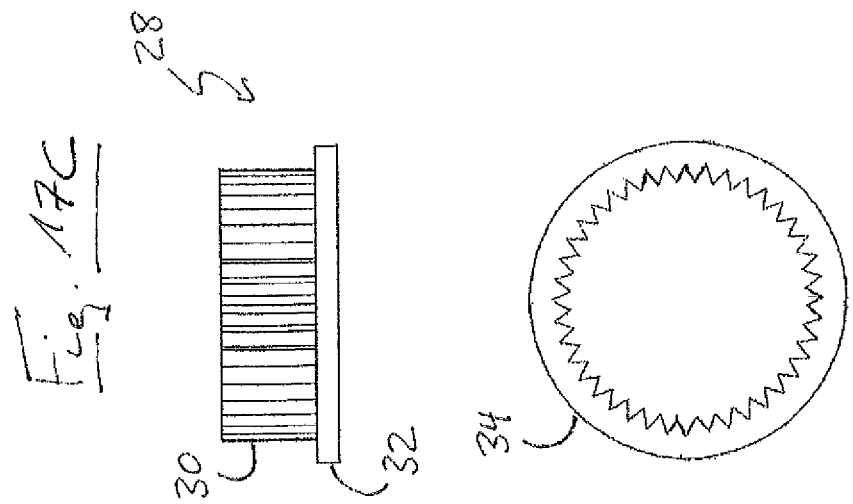
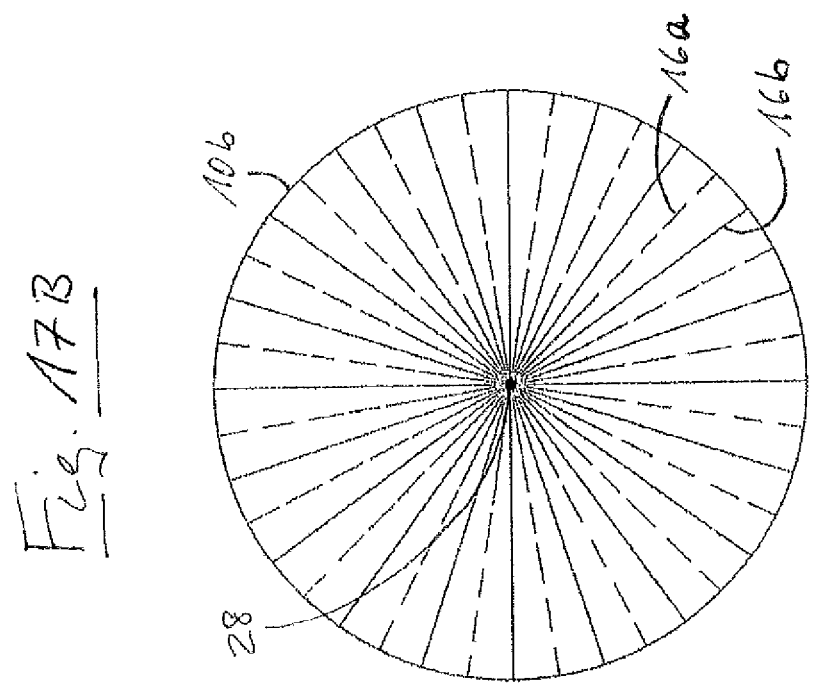

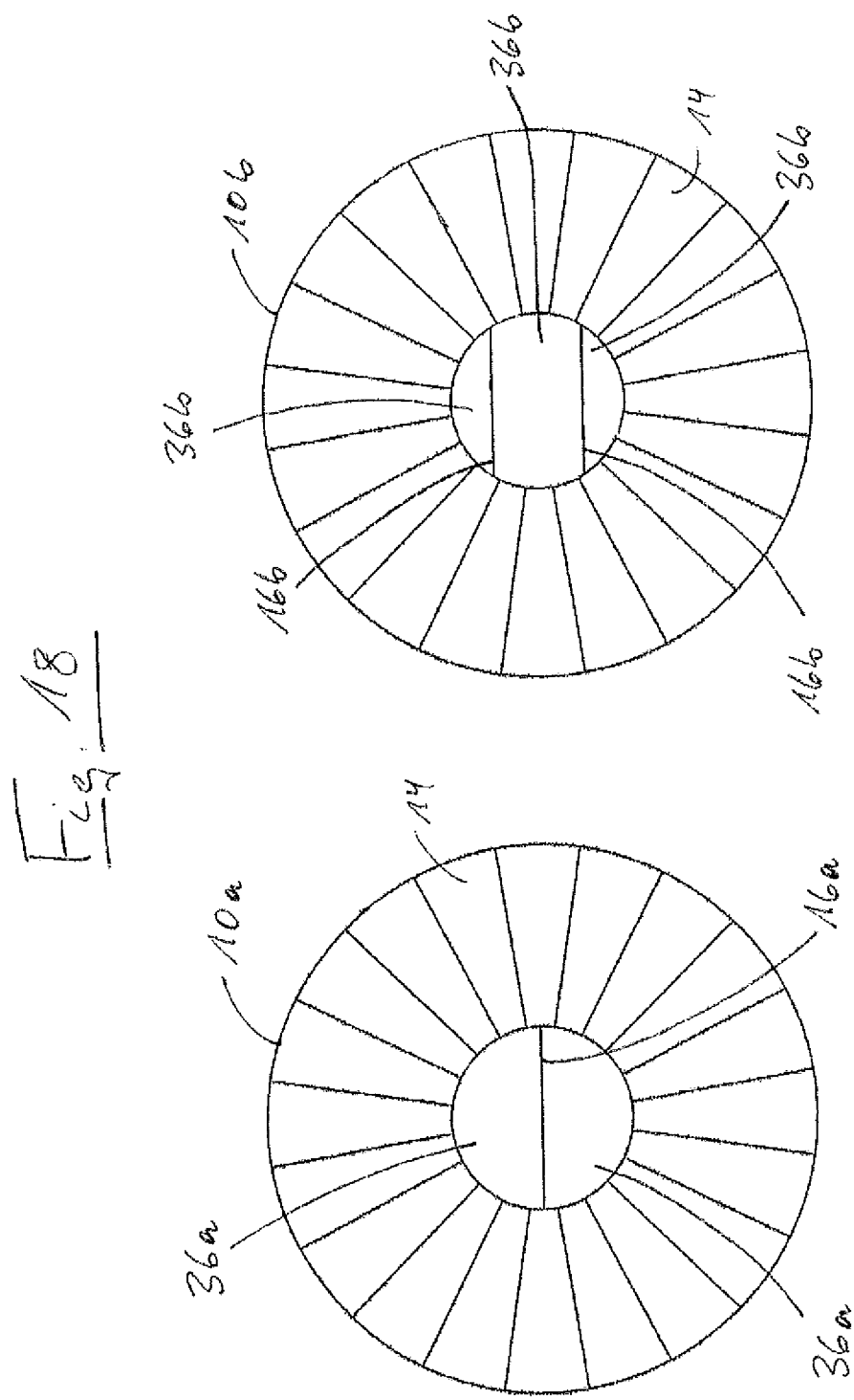

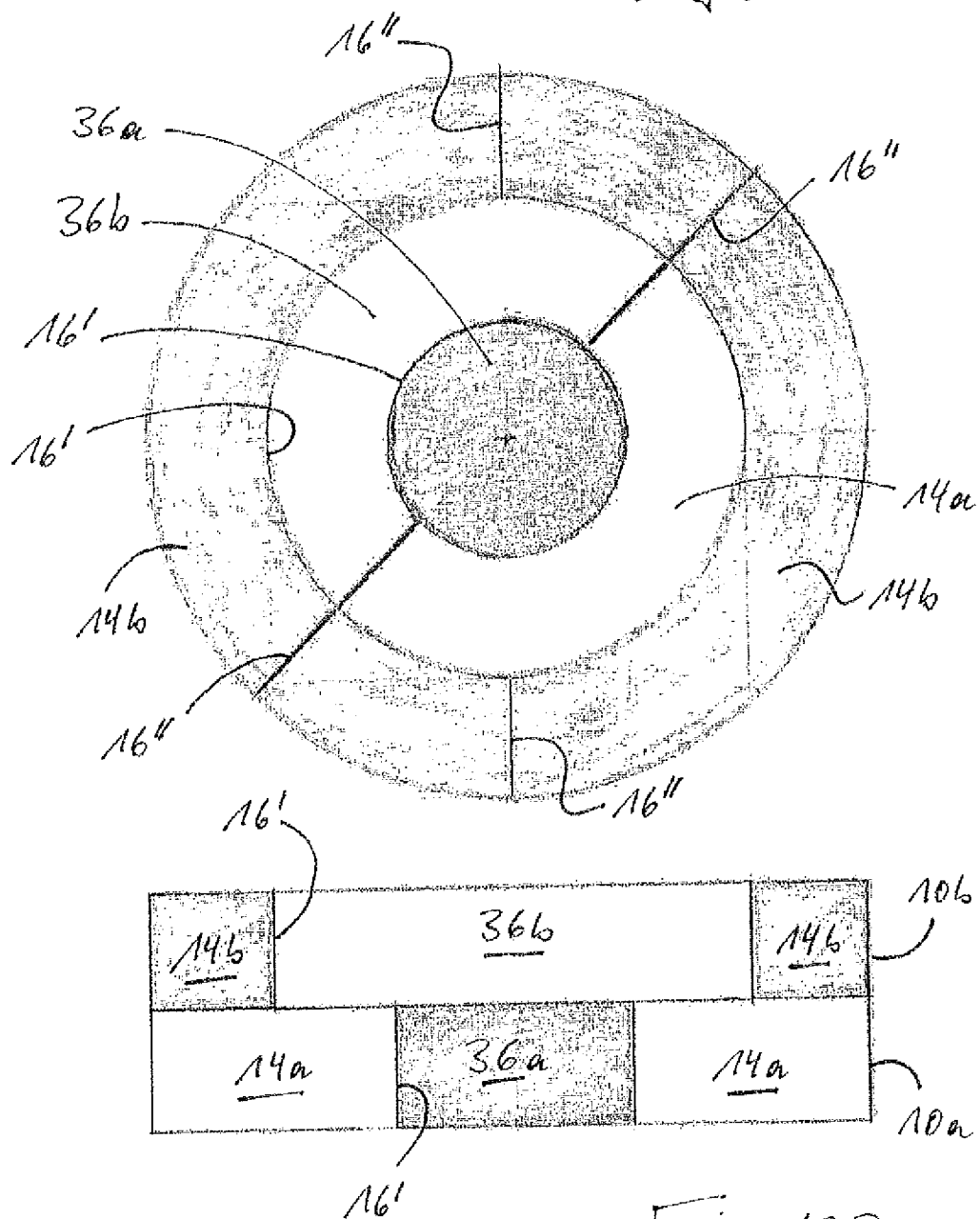

PLANAR CATALYST FILLING

CROSS-REFERENCES TO RELATED APPLICATIONS

This patent application claims the benefit of priority to European Patent Application Serial No. 16176411.3, filed Jun. 27, 2016 and International Application No. PCT/EP2017/064573, filed Jun. 14, 2017 which are incorporated herein by reference in their entirety.

The present invention relates to a catalyst filling that comprises a plurality of layers of a planar catalyst material.

Such a catalyst filling is known in principle and is typically accommodated in a reactor in which the catalyst filling is flowed through transversely and in particular at right angles to the layers of the catalyst material by a substance to be converted catalytically. In this respect, a controlled distribution of the dwell time is decisive with a number of heterogeneous catalytic conversions for the control of the activity and selectivity of the catalyzation process. This is in particular of importance in reactors having particularly large dimensions and in reactions having particularly short dwell times of the reactants in the catalyst filling; accordingly with all kinetic controlled reactions, for example in the conversion of methanol into formaldehyde, in the Ostwald process, or in the Andrussow process. In addition, a uniform reactant flow characteristic can be advantageous, in particular in the hydrogenation of gaseous or liquid reactants.

A reduction of empty spaces in the reactor and ultimately thereby an increase in the quantity of active material in the reactor is generally advantageous for all heterogeneous reactions since this contributes to increasing the efficiency of the total process per volume unit of the reactor used and thus also the possible product output per time with given reactor volumes. This is, for example, particularly advantageous in the heterogeneously catalyzed conversion of natural gas (primarily methane) in longer chain hydrocarbons (gas-to-liquid).

The reactor filling furthermore has a decisive influence on the temperature monitoring during a heterogeneously catalyzed conversion. In particular the heat supply and removal can be considerably improved by a reduction of the empty spaces within a catalyst bed. This in particular produces a reduction of hot spots and increased process stability in highly exothermic reactions.

In smaller reactors, the individual layers can be implemented by means of continuous plates of catalyst material for this purpose, i.e. each plate fully fills the inner cross-section of the reactor. Monolithic reactor fillings are also suitable here. The filling of a reactor with catalyst material proves problematic, however, when the dimensions of the reactor are considerably greater than the dimensions of individual plates of catalyst material so that a layer of catalyst material has to be composed of a plurality of plates because there is the risk here that flow passages are formed by abutment edges between adjacent plates that, viewed in the direction of flow, extend through at least a large part of the catalyst filling and spatially partially substantially reduce the dwell time of the substance to be converted and thus ultimately substantially lower the catalyst efficiency.

It is the underlying object of the invention to provide a catalyst filling that also provides an ideal catalyst efficiency in larger reactors.

This catalyst filling in accordance with the invention comprises a first layer of a planar catalyst material and a second layer of a planar catalyst material disposed thereabove, wherein the catalyst material of the first layer comprises at least two plates that each abut one another while forming an abutment edge, wherein the catalyst material of the second layer comprises at least two plates that each abut one another while forming an abutment edge, and wherein the plates of the second layer are configured and/or arranged relative to the plates of the first layer such that on a projection of the abutment edge(s) of the first layer and of the abutment edge(s) of the second layer into a common plane, no abutment edge of the first layer has more than one common point with an abutment edge of the second layer. The plates of the first layer and the plates of the second layer can, for example, have different formats and/or they can be arranged offset and/or rotated with respect to one another, in particular such that the abutment edges of adjacent layers do not include a right angle.

In other words, it is the general idea underlying the invention to make provision by a targeted configuration and/or arrangement of the plates in adjacent layers that the abutment edges of adjacent layers extend spaced apart from one another or at best intersect, but are in no way disposed congruently above one another, i.e. cover one another. It is prevented in this manner that flow passages are formed through the abutment edges that would have the result that the substance to be converted by the catalyst material flows past the plates instead of through them. As a result, in accordance with the invention, critical flow passages are therefore avoided and an ideal and settable dwell time of the substance to be converted in the catalyst filling and thus an ideal utilization of the catalyst material and consequently a maximized catalyst efficiency is ensured.

The catalyst filling in accordance with the invention can, for example, be used in a heterogeneously catalyzed reaction. The reactants and products of the heterogeneously catalyzed reaction can be present in gaseous and/or liquid form here. The catalyst filling in accordance with the invention can furthermore be used in the conversion of natural gas in longer chain hydrocarbons, in the hydrogenation/dehydrogenation of hydrocarbons, in oxidation reactions, in particular in partial oxidation reactions, in the conversion of methanol to formaldehyde, in the Ostwald process, or in the Andrussow process.

Advantageous embodiments of the invention can be seen from the dependent claims, from the description and from the drawing.

The catalyst material can, for example, comprise a foam, in particular a metal foam, a fabric, a mesh, or a gauze.

In accordance with an embodiment, a third layer of a planar catalyst material is arranged above the second layer of the planar catalyst material, with the catalyst material of the third layer comprising at least two plates that each abut one another while forming an abutment edge, and wherein the plates of the third layer are configured and/or arranged relative to the plates of the second layer and are in particular arranged offset and/or rotated with respect to one another such that on a projection of the abutment edge(s) of the second layer and of the abutment edge(s) of the third layer into a common plane, no abutment edge of the second layer has more than one common point with an abutment edge of the third layer.

The abutment edge or the abutment edges of the third layer can here be aligned congruently with the abutment edge or with the abutment edges of the first layer. It is, for example, conceivable that even layers and odd layers are each formed the same so that an alternating layering of two types of layers is present, in other words that is a layer system A-B-A-B . . . .

Alternatively, the abutment edge or the abutment edges of the third layer can also not be aligned congruently with the abutment edge or abutment edges of the first layer so that on a projection of the abutment edge(s) of the first layer and of the abutment edge(s) of the third layer into a common plane, no abutment edge of the first layer has more than one common point with an abutment edge of the third layer. For example, the third layer can also have differently dimensioned plates than the first layer and/or an offset and/or a rotation of the third layer can be present both relative to the second layer and to the first layer, which results in a layer system A-B-C.

Such a triple layer layer system A-B-C can either repeat in the catalyst filling, for example to form a total system A-B-C-A-B-C . . . , A-B-C-B-A-B-C or can also continue, for example to form a total system A-B-C-D-E . . . . In the latter case, there would therefore be a plurality of layers of a planar catalyst material that are disposed above one another and that each comprise at least two plates abutting one another while forming an abutment edge, wherein the plates of all the layers are formed differently from one another and/or are offset and/or rotated with respect to one another such that on a projection of the abutment edges of all the layers into a common plane, no two abutment edges of different layers have more than one common point.

For reasons of a simpler and less expensive manufacturing capability, the plates each have a layer of at least approximately the same dimensions. The plates of the first and second layers and in particular of every further layer disposed thereabove can accordingly have at least approximately the same dimensions. All the plates preferably have substantially the same dimensions. The thickness of the plates can, for example, lie in the range from 1 mm to 200 mm.

In accordance with an embodiment, the plates of the first and second layers and in particular of every further layer disposed thereabove can be formed as rectangular. The use of rectangular plates is in particular suitable for a catalyst filling that is provided for a reactor having a planar bottom.

The plates can, for example, each have a width in the range from 20 mm to 3000 mm, preferably in the range from 400 m to 1100 mm, and can have a length in the range from 200 m to 3500 mm, preferably in the range from 800 to 1000 mm. The thickness of the plates can lie in the range from 1 mm to 200 mm.

It is understood that the design of the plates is generally not restricted to rectangular shapes. Different shapes can rather also be considered such as any desired polygons, but also partially round shapes or completely round shapes.

The catalyst filling can be produced in a particularly economic manner if a plurality of plates of a layer are connected to form a plate band and if two mutually abutting plate bands define a abutment edge. Adjacent plates of a layer of a plate band can respectively overlap here. A particularly simple connection of two plates of a plate band can be achieved in this case if the plates are rolled at least in their overlap region. Alternatively or additionally, it is also conceivable to connect two adjacent plates to one another in accordance with the principle of a tongue and groove or with the principle of groove and groove. It is additionally conceivable to sew, to weld, or to press adjacent plates to one another, to staple them together or to connect them to one another in a different manner.

If the catalyst filling should be arranged in a reactor having a bubble tray, it is advantageous if the plates of the first and second layers, and in particular of every further plate disposed thereabove, is/are formed in a manner similar to a trapezoid or to a sector. Plates of such shapes are, however, generally also suitable for the catalyst filling of a reactor having a planar bottom, in particular if the reactor has a circular inner contour The plates of the first and second layers and in particular of every further layer disposed thereabove are advantageously each arranged while forming a circular plate ring. It is understood that the plates of consecutive layers arranged in ring shape have an angular offset with respect to one another to prevent the abutment edges between adjacent plates of a layer from being congruently aligned with those of the layer disposed thereabove. The circular plate rings of consecutive layers are so-to-say therefore rotated about their centers with respect to one another.

Each circular plate ring advantageously defines an inner circle. The plates arranged in ring form therefore do not converge at the center. Instead, a central region is provided that can be filled separately, e.g. by at least one central plate abutting or overlapping the circular plate ring, whereby the formation of a central flow passage is avoided. To prevent abutment edges between the at least one central plate and the plates of respective consecutive layers arranged in ring form from being aligned congruently with one another, it is advantageous if the inner diameters of the planar circular rings or the diameters of the at least one central plate of consecutive layers differ.

Alternatively, however, it is also possible to configure the inner diameters of the circular plate rings of all the layers as at least approximately the same. In this case, the central region defined by the circular plate rings can be closed by an end cap, in particular by an end cap holding the plates together, to prevent the formation of a central flow passage.

The end cap here does not have to be formed from catalyst material. The end cap can, for example, be a locator that specifies the correct position of the plates arranged in ring form and/or a position holder that holds the plates in their correct position, e.g. clamps them together.

Such a locator and/or position holder can generally also be provided at a different point, for example at a wall of the reactor in which the catalyst filling is introduced. Such a locator and/or position holder can in particular also be used for the relative alignment of layers that are made up of rectangular plates.

Irrespective of the shape that the plates ultimately have, in particular irrespective of whether they are formed as rectangular, trapezoid-like, in the form of another polygon as round, or similar to a sector, the manufacture of the catalyst filling can be further simplified in that a respective plurality of plates disposed above one another are connected to form a plate stack obliquely disposed in at least one direction, i.e. each subsequent plate is arranged offset relative to the preceding plate in the same direction by a certain amount, with the amount of the offset being able to be identical for all the plates of a stack in one direction. The plates of a plate stack can all be of the same type, for example rectangular. All the plates of a plate stack can in particular have the same dimensions. Alternatively, the plates can, however, also become smaller, viewed in the stack direction; for example, can have decreasing widths and/or lengths. The plates of a plate stack can be sewed, welded, or pressed to one another, can be stapled to one another, or connected to one another in a different manner.

To form the catalyst filling, a plurality of plate stacks only have to be arranged next to one another such that the oblique sides of adjacent stacks cover one another. Adjacent plate stacks can then in turn be sewed, welded, or pressed to one another, can be stapled to one another, or can be connected to one another in a different manner.

A further subject matter of the invention is a reactor having a catalyst filling of the manner described above.

Figure 2:
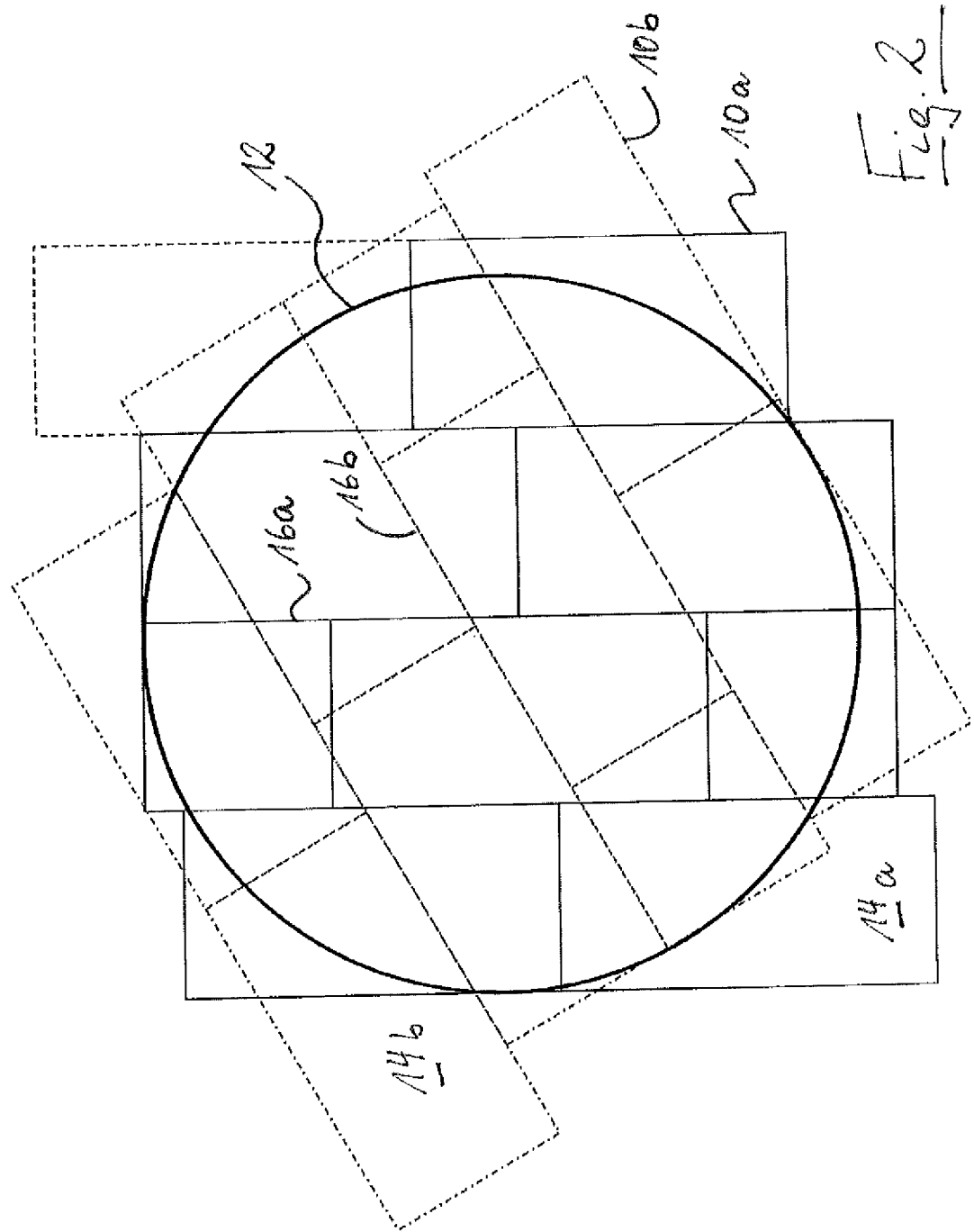
Figure 4:
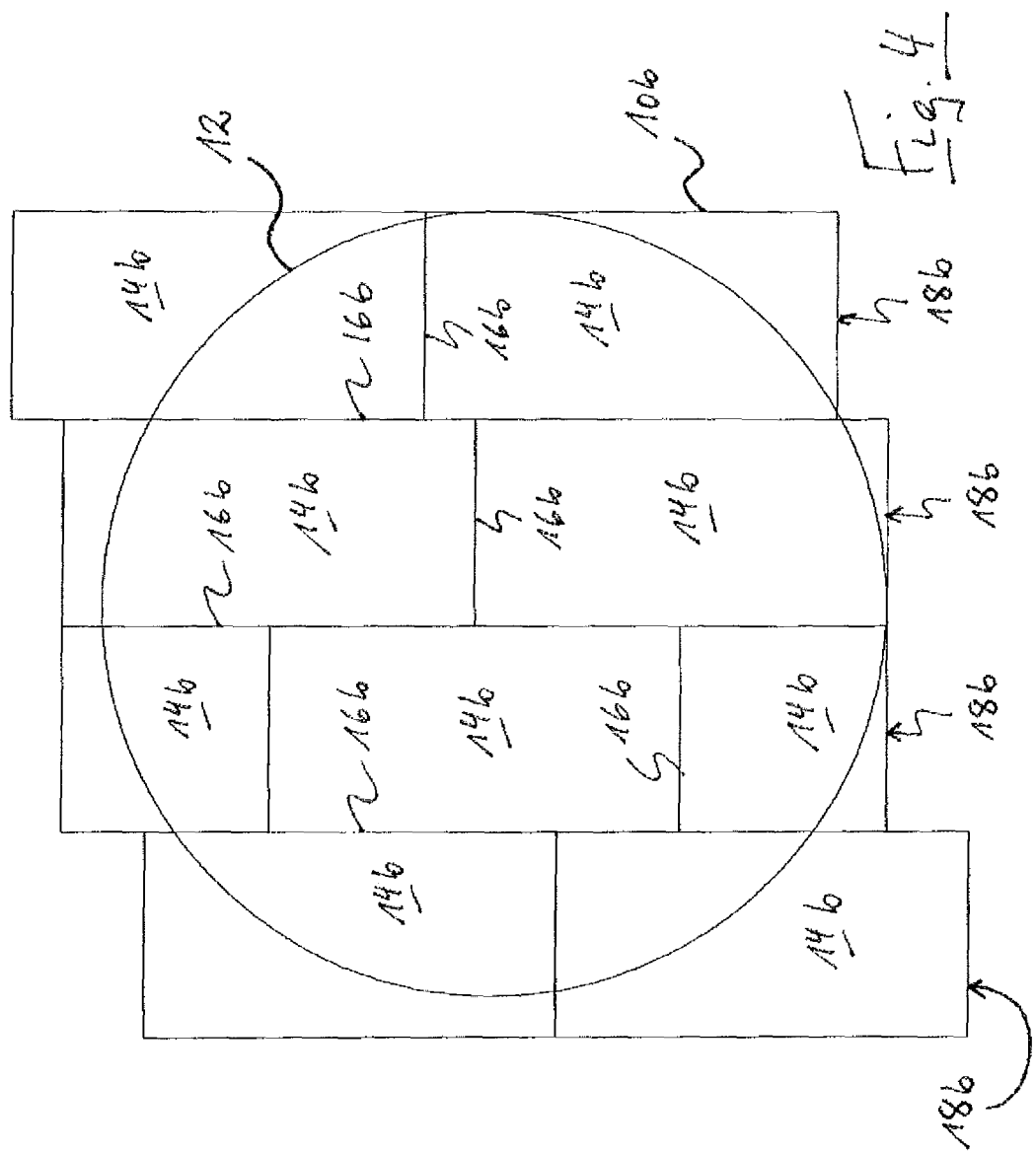

The invention will be described in the following purely by way of example with reference to possible embodiments and to the enclosed drawing. There are shown:

FIG. 1 a first variant of a layer of a catalyst filling;
FIG. 2 a first arrangement of two layers of the first variant;
FIG. 4 a second variant of a layer of a catalyst filling;
FIG. 5 an arrangement of a layer of the first variant and of a layer of the second variant;
FIG. 6 a first arrangement of three layers of a catalyst filling;
FIG. 7 a second arrangement of three layers of a catalyst filling;
FIG. 8 a third variant of a layer of a catalyst filling;
FIG. 9 an arrangement of three layers of the third variant;
FIG. 10A a first embodiment of a molding built up of thirteen plates;
FIG. 10B a catalyst filling that is composed of a plurality of moldings of the embodiment of FIG. 10A;
FIG. 10C plan views of the individual layers of the catalyst filling of FIG. 10B;
FIG. 11A a second embodiment of a molding built up of thirteen plates;
FIG. 11B a catalyst filling that is composed of a plurality of moldings of the embodiment of FIG. 11A;
FIG. 11C plan views of the individual layers of the catalyst filling of FIG. 11B;
FIG. 12 a first embodiment of a molding band having thirteen layers;
FIG. 13 a second embodiment of a molding band having thirteen layers;
FIG. 14 a third embodiment of a molding band having thirteen layers;
FIG. 15 a fourth embodiment of a molding band having thirteen layers;
FIG. 16 plan views of the individual layers of a catalyst filling that is composed of a plurality of molding bands of the embodiment of FIG. 15;
FIG. 17A a perspective view of a catalyst filling that is formed from a plurality of layers of a fourth variant;
FIG. 17B a plan view of the catalyst filling of FIG. 17A;
FIG. 17C a position holder of the catalyst filling of FIG. 17A;
FIG. 18 two layers in accordance with a fifth variant;
FIG. 19A a plan view of two layers in accordance with a sixth variant; and
FIG. 19B a cross-sectional view of the layers of FIG. 19A.

FIG. 1 shows a first variant of a layer 10 of a catalyst filling built up of a plurality of layers of a catalyst material and provided for arrangement in a reactor whose inner periphery is represented by a circle line 12. In the present embodiment, the reactor has an inner diameter of 190 mm.

The catalyst material can, for example, be a metal foam that can be coated, depending on the application, by an additional reactive substance. Alternatively, the catalyst material can, however, also comprise a fabric, a mesh, or a gauze.

The layer 10 is composed of a plurality of plates 14 of a catalyst material that are formed as rectangular in the present embodiment. Most of the plates 14 have a length of 100 mm and a width of 50 mm, but with half plates 14 also being used that are square. The thickness of a plate 14 can lie in the range from 1 mm to 200 mm. The assembled plates 14 are cut to shape along the circle line 12 to establish a circular shape of the layer 10a adapted to the reactor.

The plates 14 are arranged next to one another such that respective adjacent plates 14 abut one another while forming an abutment edge 16. Plates 14 arranged next to one another by length form a plate band 18. Adjacent plate bands 18 are here arranged offset with respect to one another such that the abutment edges 16 between adjacent plates 14 within a plate band 18 are not aligned congruently with the abutment edges 16 between plates 14 of an adjacent plate band 18 that are adjacent to another. An outermost left plate band 18 is aligned flush at the left with the circle line 12, whereas the upper ends of two middle plate bands 18 in FIG. 1 are aligned flush with the circle line 12.

The individual plate bands 18 can already be prefabricated in that the plates 14 forming the respective plate band 18 are connected to one another. If the catalyst material, for example, comprises a metal foam, it is sufficient for the connection of adjacent plates 14 to allow them to overlap slightly, e.g. over a length of a few millimeters, and to roll the overlap regions. Alternatively to a simple overlap, adjacent plates 14 of a plate band 18 can engaged into one another in the manner of a tongue and tongue or of a groove and tongue at their abutment edges 16. The plate band 18 can also be additionally rolled in this case; however, this is not absolutely necessary depending on the specific configuration of the abutment edges 16 of adjacent plates 14. Alternatively, the plates 14 can be sewed, welded or pressed to one another or can be stapled to one another.

Figure 3:
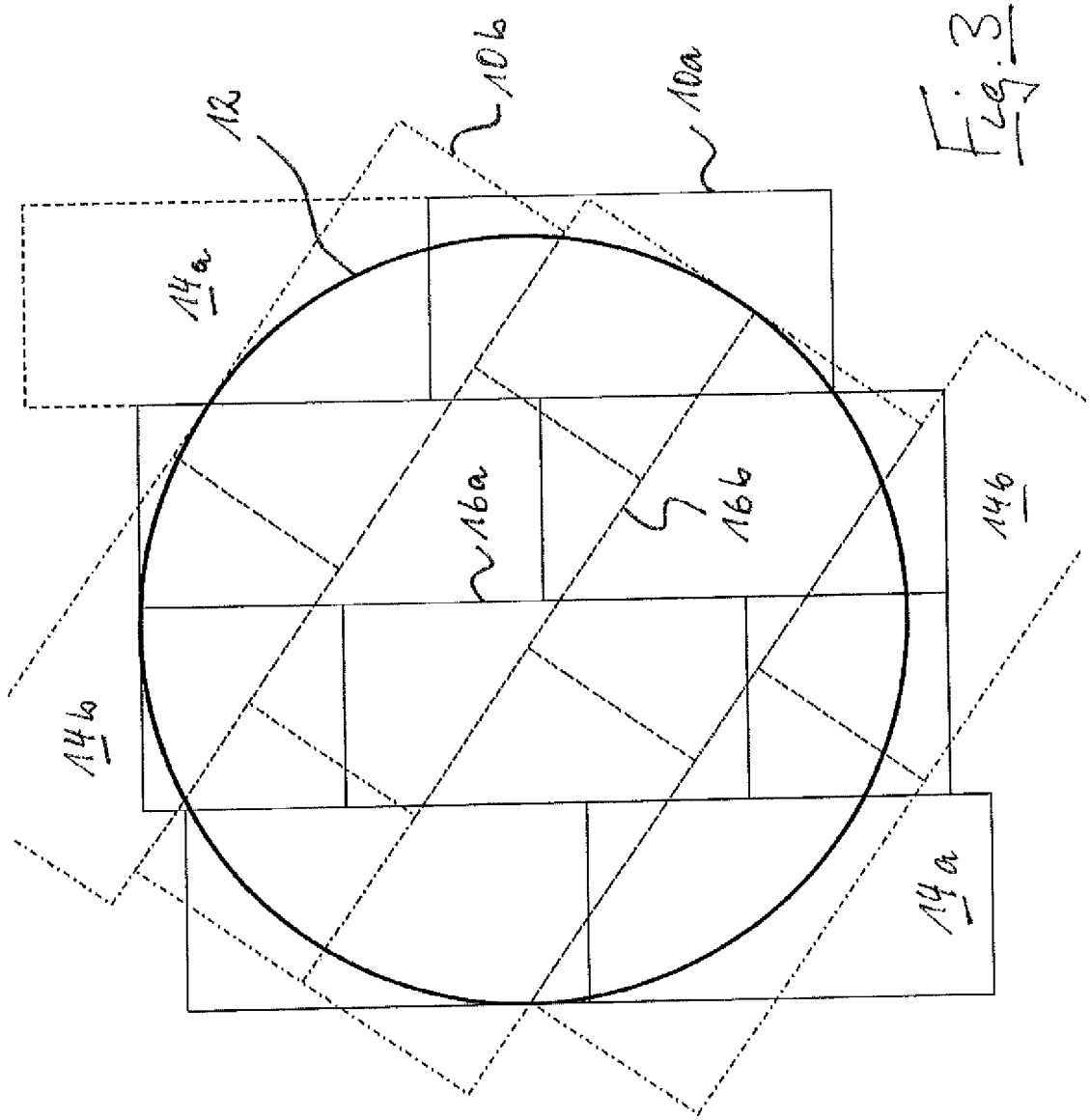

Depending on the desired thickness of the catalyst filling and depending on the thickness of the individual plates, the catalyst filling comprises at least one further layer of catalyst material that is arranged above a first layer 10a shown as in FIG. 1. Such a second layer 10b can be configured like the first layer 10a. However, on the arrangement of the second layer 10b on the first layer 10a, it is necessary to take care, for the avoidance of unwanted flow passages, that the abutment edges 16b of the second layer 10b are not aligned congruently with the abutment edges 16a of the first layer 10a. For this purpose, the second layer 10b can, for example, be arranged rotated by an angle of 240° clockwise relative to the first layer 10a, as is shown in FIG. 2. The center of rotation for the rotation is here defined by the center of the reactor or of the circle line 12. Alternatively, a rotation of the second layer 10b relative to the first layer 10a clockwise by an angle of rotation of 125° is also possible, as is shown in FIG. 3. It is ultimately achieved by both rotations that the abutment edges 16a of the first layer 10a and the abutment edges 16b of the second layer 10b can admittedly intersect at certain angles, but are in no way disposed congruently above one another.

The same effect is achieved if the second layer 10b has a somewhat different structure, as shown in FIG. 4, than the first layer 10a of FIG. 1 and thus forms a second layer variant. Specifically, the second layer 10b shown in FIG. 4 is aligned flush right with the circle line 12. In addition, the longitudinal directions of the individual plate bands 18b of the second layer 10b are displaced relative to the plate bands 18a of the first layer and indeed such that the middle two plate bands 18b end flush below with the circle line 12. In the arrangement of the second layer 10b on the first layer 10a, the first layer 10 is additionally not placed in the position shown in FIG. 1, but is rather additionally rotated clockwise by 90°, as is shown in FIG. 5.

Depending on the desired thickness of the catalyst filling and on the thickness of the individual plates, the catalyst filling can additionally have a third layer 10c composed of a plurality of plates 14c. In this respect, to avoid unwanted flow passages, care must be taken that the abutment edges 16c of the third layer 10c are also at least not aligned congruently with the abutment edges 16b of the second layer 10b. As is shown in FIG. 6, this can, for example, be achieved in that a second layer 10b is arranged in a non-rotated manner in accordance with FIG. 4 on a first layer 10a configured in accordance with FIG. 1, i.e. the plates 14b of the second layer 10b are here only offset from the plates 14a of the first layer 10a and in that finally, the first layer 10a of FIG. 1 is arranged rotated clockwise by 90° as a third layer 10c on the second layer 10b. It is ensured in the embodiment that the abutment edges 16a, 16b of the first and second layers 10a, 10b and the abutment edges 16b, 16c of the second and third layers 10b, 10c are each not aligned congruently with one another. Nevertheless, the abutment edges 16c of the third layer 10c are, however, partly congruent above the abutment edges 16a of the first layer 10a, i.e. a certain alignment of abutment edges 16a, 16c of the first and third layers 10a, 10c, 10c is present here. However, this is not particularly critical since a plate 14b of the second layer 10b is anyway disposed completely therebetween and the formation of a continuous flow passage is thus prevented.

As is shown in FIG. 7, an alignment of the abutment edges 16a, 16b, 16c of all three layers 10a, 10b, 10c can be completely avoided if the first layer 10a is positioned rotated clockwise by 270° with respect to the arrangement shown in FIG. 1, if the second layer 10b of FIG. 4 is arranged hereon, and if the second layer 10b is arranged thereabove as the third layer 10c, and indeed rotated clockwise by 65° with respect to the position of FIG. 4. As can be recognized in FIG. 7, the abutment edges 16a, 16b, 16c of the first, second, and third layers 10a, 10b, 10c intersect; however, there are no superpositions of the abutment edges 16a, 16b, 16c of the different layers 10a, 10b, 10c.

A third variant of a layer 10 of a catalyst filling for a cylindrical reactor having a diameter of 190 mm is shown in FIG. 8. This variant of a layer 10 ultimately only differs from the variant shown in FIG. 1 in the dimensions of the individual plates 14 that respectively have a length of 40 m and a width of 20 mm in the variant of FIG. 8.

Starting from the layer shown in FIG. 8 as the first layer 10a, a triple layer catalyst filling shown in FIG. 9 can be built up in that the first layer 10a of FIG. 8 is rotated clockwise by 120° as the second layer 10b and the first layer 10a of FIG. 8 is arranged hereon rotated clockwise by 180° as a third layer 10c. It is likewise ensured in this layer system that the abutment edges 16 of adjacent layers 10a, 10b or 10b, 10c admittedly intersect, but are not aligned congruently with one another. However, some of the abutment edges 16c of the third layer 10c are disposed congruently above the abutment edges 16a of the first layer 10. As already mentioned, this is, however, not particularly critical since a plate 14b of the second layer 10b is disposed completely therebetween and the formation of a continuous flow passage is thus prevented.

Instead of building up the catalyst filling layer for layer from individual plates 14 or from prefabricated plate bands 18, it is also possible to compose the catalyst filling from a plurality of prefabricated moldings 20 that each comprise a plurality of plates 14 layered above one another and connected to one another. The number of plates 14 of a molding 20 can here be selected such that the thickness of the molding 20 already corresponds to the desired thickness of the catalyst filling. If the desired thickness of the catalyst filling should be larger than the thickness of the individual moldings 20, it is naturally possible to arrange two or more layers of moldings 20 above one another.

To prevent the abutment edges 16 from being disposed above one another between the plates 14 of adjacent moldings 20 and from forming an unwanted flow passage, a resulting side surface 22 of a molding 20 that is adjacent to an adjacent molding 20 may not extend at a right angle to the planes spanned by the plates 14 of the molding 20. The boundary surfaces between adjacent moldings 20 and thus the mutually abutting side surfaces 22 of adjacent moldings 20 should rather always extend obliquely to the planes spanned by the plates 14 of the moldings 20. For this purpose, the moldings 20 can be cut with a corresponding slant or the oblique side surfaces 22 can be formed by plates 14 projecting in the manner of steps.

A first embodiment of a molding 20 that satisfies this criterion is shown in FIG. 10A. Specifically, the molding 20 shown in FIG. 10A is composed of thirteen plates 14 of a catalyst material that are layered on one another and that each have a width of 80 mm and a length of 200 mm. In this respect, the plates 14 are not layered flush above one another while forming a parallelepiped layer stack, but are rather arranged offset by 5 mm in each case in two directions, namely in the direction of their lengths and in the direction of their widths, so that the molding 20 has the shape of a parallelepiped.

To form a catalyst filling, a sufficient number of moldings 20 are arranged next to one another and are cut to the shape of the reactor in which the catalyst filling is to be used. A catalyst filling is, for example, shown in FIG. 10B that is composed of eight of the moldings 20 shown in FIG. 10A and that is cut to shape in a circular manner suitably for a cylindrical reactor having an inner diameter of 200 mm.

The abutment edges 16 of the first layer 10 that here forms the topmost layer can be recognized at the upper side of the catalyst filling of FIG. 10B. As FIG. 10C shows, the abutment edges 16 migrate, due to the offset of the plates 14, within the moldings 20 starting from the topmost layer 10a through the catalyst filling downwardly to the bottommost layer 10m from layer to layer ever further to the top left in the Figure, whereby it is ensured that no two abutment edges 16 of different layers are disposed congruently above one another, i.e. are aligned congruently with one another.

It is understood that the design of the moldings 20 is not restricted to parallelepipeds. The moldings 20 can rather also be formed in the shape of truncated pyramids or can have the design of a trapezoid prism or another suitable design.

A molding 20 is shown, for example, in FIG. 11A that is composed of thirteen rectangular plates 14 layered above one another, with the length of all the plates 14 being the same, but with the width of the plates 14 increasing from top to bottom. The width of the topmost plate 14' in the embodiment shown specifically amounts to 44 mm, while the plate thereunder has a width of 47 mm and the width of every plate following downwardly also increases by 3 mm down to the bottommost plate 14" that has a width of 80 mm. The cross-sectional contour of the molding 20 is therefore similar to a trapezoid, more precisely to a trapezoid having stepped oblique sides. The length of all the plates 14 is the same and amounts to 200 mm in the present embodiment. However, the plates 14 are each arranged offset by 5 mm with respect to the plate 14 disposed thereunder so that the contour of the molding 20 viewed in the longitudinal section is similar to a parallelogram, more precisely to a parallelogram with stepped oblique sides.

To form a catalyst filling, a plurality of the moldings 20 shown in FIG. 11A are arranged next to one another and, as shown in FIG. 11B, are cut to a desired shape, here to a cylindrical shape having a diameter of 200 mm. The arrangement of the moldings 20 takes place here such that a plurality of moldings 20 are arranged in rows by length after one another, with the moldings 20 of adjacent rows being conversely arranged such that the respective narrowest plates 14' within a row face upward and the widest plates 14" are correspondingly disposed downward, while conversely within an adjacent row the widest plates 14" face upward and the narrowest plates 14' are disposed downward. Viewed in cross-section, adjacent rows of moldings 20 there have trapezoid-like contours with a base disposed alternately downward and upward.

FIG. 110 shows how the abutment edges 16 between adjacent plates 14 change their positions from layer 10 to layer 10 through the catalyst filling. It is also ensured by the oblique side surfaces 22 of the moldings 20 in the embodiment that, viewed through the catalyst filling, no two abutment edges 16 are disposed congruently above one another or are aligned congruently with one another.

The preparation of a catalyst filling can be simplified if a plurality of moldings 20 are already connected to form a molding band 24, with the individual plates 14 of adjacent moldings 20 ideally overlapping.

FIG. 12, for example, shows a first embodiment of a molding band 24 that is composed of a plurality of moldings of the same kind and that each have the design of a parallelepiped, in a similar manner to the molding 20 described with reference to FIG. 10A. I.e. all the plates 14 of a molding 20 have the same length and the same width, specifically here 400 mm×200 m, and the plates 14 of each molding 20 are arranged offset relative to a plate disposed thereunder in two directions at right angles to one another, namely in the direction of their length and in the direction of their width. In addition, the plates 14 of adjacent moldings 20 overlap in the overlap region 26. Although only two moldings 20 are shown in FIG. 12, it is understood that, if a longer molding band 24 is required, further moldings 20 of the same kind can adjoin them.

A second embodiment of a molding band 24 is shown in FIG. 13 that is composed of two moldings 20 that, viewed in cross-section, have a trapezoid-like design and, viewed in the longitudinal section, have a parallelogram-like design. These moldings 20 are therefore formed in a similar manner to the molding 20 shown in FIG. 11A. The plates 14 of adjacent moldings 20 also overlap in the overlap region 26 in the embodiment shown in FIG. 13. If a longer molding band 24 is required, further moldings 20 of a similar kind can adjoin the two moldings 20 shown in FIG. 13.

FIG. 14 shows a third embodiment of a molding band 34 that is composed of a plurality of moldings 24 of the same kind, with each molding 20 being built up of a plurality of right-angled plates 14 layered above one another. The length of each plate 14 of a molding 20 thus reduces upwardly starting from the bottommost plate 14 so that the molding band 24 has a trapezoid-like design viewed in the longitudinal section. Specifically, the bottommost plate 14 has a length of 400 mm, whereas the uppermost plate 14 has a length of only 200 mm. The width of all the plates 14 of a molding 20 is the same, in contrast, and the longitudinal margins of the plates 14 of a molding 20 are arranged flush with one another such that the molding 20 has a rectangular contour viewed in cross-section. The plates 14 of adjacent moldings 20 overlap in the overlap regions 26.

FIG. 15 shows a fourth embodiment of a molding band 24 that is composed of a plurality of moldings 20 of the same kind, with each molding 20 being built up of a plurality of right-angled plates 14 layered above one another. The length and width of all the plates 14 of a molding 20 are each the same. In addition, the plates 14 of each molding 20 are arranged offset relative to a plate disposed thereunder in the direction of their length, which gives the molding 20 a parallelogram-like contour viewed in the longitudinal section. In the direction at a right angle thereto, the plates 14 of each molding 20 end flush, i.e. each molding 20 has a rectangular contour viewed in cross-section. As before, the plates 14 of adjacent moldings 20 overlap in overlap regions 26.

FIG. 16 shows the individual layers 10a to 10m of a thirteen-layer catalyst filling that is composed of six molding bands 24 of the kind shown in FIG. 15 arranged next to one another. As can be seen from FIG. 16, the abutment edges 16 between adjacent molding bands 24 migrate ever further to the right from layer to layer due to the offset of the individual plates 14 within a molding band 24 so that none of these abutment edges 16 are disposed congruently above one another, with the latter not only applying to consecutive layers. but also to all the layers 10a to 10m.

The above-described catalyst fillings comprising right-angled plates 14 are in particular suitable for use in reactors having planar bottoms. If the bottom is, however, curved or spherical, such as in a reactor having a bubble tray, the plates 14 having a trapezoid-like or sector-like shape prove more favorable.

A catalyst filling for a reactor having a bubble tray and having a diameter of e.g. 2800 mm is thus shown in FIG. 17A that, as before, comprises at least two layers that are each composed of a plurality of sector-like plates 14 of equal size, twenty in the present embodiment, that complement one another to form a circular layer, with the tips of the sector-like plates 14 meeting at the center of the circle. Adjacent plates 14 abut one another while forming radially extending abutment edges 16.

As can be recognized in FIG. 17B, a corresponding second layer 10b is arranged above a first layer (not shown), said second layer being rotated by a certain angle, e.g. of 9°, with respect to the circle center so that the abutment edges 16b (solid lines) of the second layer 10b are not aligned congruently with the abutment edges 16a (dashed lines) of the first layer, i.e. are not disposed exactly above them. It is understood that further layers that are likewise arranged rotated with respect to the respective layer disposed thereunder can be provided to complete the catalyst filling so that at least the abutment edges of layers disposed directly above one another are not aligned congruently with one another. Ideally, the angular offset from layer to layer in each case takes place in the same direction by an angular amount that ensures that no two abutment edges are aligned congruently with one another viewed over the total catalyst filling.

To prevent the formation of an unwanted flow passage at the center of the catalyst filling, the radially inwardly facing ends of the plates 14 can be clamped tight by a centrally arranged position holder 28 that is show in more detail in FIG. 17C. The position holder 28 comprises a cylindrical base body 30 to whose lower end a radially projecting first collar 32 is fixedly attached and on whose upper end a radially projecting second collar 34 can be attached such that the radially inwardly facing ends of the plates 14 are clamped between the collars 32, 34. The cylindrical base body 30 has angle markings at its jacket surface that indicate the desired positions of the plates 14, whereby the position holder 28 not only fixes the positioned plates 14, but also facilitates the positioning of the plates 14 themselves in that it defines the correct arrangement of the plates 14.

Instead of a position holder 28, the central region of each layer 10 can, as shown in FIG. 18, also be filled by a plurality of central plates 36 that are arranged next to one another, that are cut to circular shape, and that overlap the sector-like plates 14. So that the abutment edges 16a of a layer 10a formed between adjacent central plates 36a and the abutment edges 16b of a layer 10b disposed thereabove between adjacent central plates 36b are not aligned congruently with one another, the central plates 26 are arranged offset from one another from layer to layer. Alternatively or additionally, the central plates 36 of consecutive layers 10 can also be arranged rotated with respect to one another.

It is understood that depending on the size of the central region filled by the central plates 36, the plates 14 arranged in ring shape no longer need to be formed in a sector-like manner, but can instead be shorter, i.e. more trapezoid-like.

It is further understood that in the event of a sufficiently small central region, it can also be filled by a single central plate 36 that is in particular cut to circular shape.

If the central plate(s) 36 and the plates 14 arranged in a ring shape do not overlap within a layer 10, but rather abut one another while forming an abutment edge in the form of a circle line, a corresponding central plate 36 or corresponding central plates 36 of a layer 10 disposed thereabove should have a different diameter than the central plate 36 disposed thereunder to avoid an unwanted flow passage. Both the layer types A-B-A-B . . . , A-B-C-B-A-B-C . . . , A-B-C-A-B-C . . . and A-B-C-D-E . . . are possible here. The diameter of the central plate(s) 36 preferably changes over the total catalyst filling from layer to layer. For example, the diameter of the central plate(s) 36 can constantly increase or decrease from layer to layer.

It can furthermore be advantageous if the diameter of the central plate(s) increases and decreases in a pattern. The position of a layer along the height of the catalyst bed can hereby be exactly defined. Care must also be taken here that the abutment edges of two consecutive layers do not overlap. The central plate of each layer preferably has a diameter different from all the other layers.

An embodiment is shown in FIG. 19 in which a circular central plate 36 is only surrounded by two ring segment-like plates 14 that are radially outwardly adjacent to the central plate 36 and complement each other to form a closed plate ring. In the embodiment shown, both ring segment-like plates 14 extend over an angular range of 180°, i.e. each ring segment-like plate 14 forms a half ring. In principle, the ring segment-like plates 14 can, however, also extend over different angular ranges or more than two ring segment-like pates 14 can complement one another to form a closed ring, e.g. three ring segment-like plates 14 that each extend over an angular range of 120°. The layer structure is furthermore not restricted to one central plate 36 and one plate ring. For example, more than two plate rings can be arranged around the central plate 36, each of which is composed of two or more ring segment-like plates 14.

A layer 10 of the kind shown in FIG. 19 has both abutment edges 16' extending in the peripheral direction and radially extending abutment edges 16". To avoid unwanted flow passages, care must be taken as in the embodiments described above that the abutment edges 16 of two consecutive layers 10 do not overlap.

As has already been explained with reference to FIG. 18, the central plates 36a, 36b and the associated plate rings have consecutive layers 10a, 10b have different diameters for this purpose, on the one hand. On the other hand, the ring segment-like plates 14 of the one layer 10a are arranged about the center of the central plates 36a, 36 rotated relative to the ring segment-like plates 14b of the following layer 10b.

For reasons of completeness, it must be pointed out here that a catalyst filling built up of sector-like, trapezoid-like, or ring segment-like plates 14 cannot only be used in reactors having reactors with bubble trays, but equally well in reactors having planar bottoms.

REFERENCE NUMERAL LIST 10 layer
10a first layer
10b second layer
10c third layer
12 circle line
14 plate
16 abutment edge
18 plate band
20 molding
22 side surface
24 molding band
26 overlap region
28 position holder
30 base body
32 collar
34 collar
36 central plate

The invention claimed is:

1. A catalyst filling comprising:
a first layer of a planar catalyst material and a second layer of a planar catalyst material disposed thereabove,
wherein the catalyst material of the first layer comprises at least two plates that each abut one another while forming an abutment edge;
wherein the catalyst material of the second layer comprises at least two plates that each abut one another while forming an abutment edge; and
wherein the plates of the second layer are configured and/or arranged relative to the plates of the first layer that on a projection of the abutment edge(s) of the first layer and of the abutment edge(s) of the second layer into a common plane, no abutment edge of the first layer has more than one common point with an abutment edge of the second layer,
wherein moldings are defined, each molding comprising at least one plate from the first layer and at least one plate from the second layer, wherein in each molding the at least one plate from the second layer is layered above the at least one plate from the first layer;
wherein each of the first layer and the second layer comprises at least two plates from at least two moldings adjacent to one another so that said abutment edges are between plates of adjacent moldings;
wherein each molding comprises a plurality of plates from the first layer and the second layer connected to one another in the form of a plate stack obliquely displaced in at least one direction,
wherein the plates comprise metal foam,
wherein the first layer and the second layer define a circular shape.

2. The catalyst filling in accordance with claim 1, wherein a third layer of a planar catalyst material is arranged above the second layer of the planar catalyst material, with the catalyst material of the third layer comprising at least two plates that each abut one another while forming an abutment edge, with the plates of the third layer being configured and/or arranged relative to the plates of the second layer such that on a projection of the abutment edge(s) of the second layer and of the abutment edge(s) of the third layer into a common plane, no abutment edge of the second layer has more than one common point with an abutment edge of the third layer.

3. The catalyst filling in accordance with claim 2, wherein the abutment edge or abutment edges of the third layer is or are congruently aligned with the abutment edge or with the abutment edges of the first layer.

4. The catalyst filling in accordance with claim 2, wherein, on a projection of the abutment edge(s) of the first layer and of the abutment edge(s) of the third layer into a common plane, no abutment edge of the first layer has more than one common point with an abutment edge of the third layer.

5. The catalyst filling in accordance with claim 1, wherein the plates of all the layers being configured and/or arranged with respect to one another such that on a projection of the abutment edges of all the layers into a common plane, no two abutment edges of different layers have more than one common point.

6. The catalyst filling in accordance with claim 1, wherein the plates of the first and second layers are cut to define the circular shape.

7. The catalyst filling in accordance with claim 6, wherein the plates of one or more additional layers disposed above the first and second layers are formed to define the circular shape.

8. The catalyst filling in accordance with claim 1, wherein the at least two plates of each layer are part of a respective plurality of plates of each layer, wherein the plurality of plates of each layer form at least two plate bands, wherein the at least two plate bands of each layer are mutually abutting plate bands that define a respective abutment edge.

9. The catalyst filling in accordance with claim 8, wherein adjacent plates of at least one of the plate bands respectively overlap one another.

10. The catalyst filling in accordance with claim 1, wherein the plates of the first layer and/or the second layer have approximately the same dimensions.

11. The catalyst filling in accordance with claim 10, wherein a plurality of plates of one or more additional layers disposed above the first and second layers have approximately the same dimensions.

12. The catalyst filling in accordance with claim 1, wherein the plates of the first and second layers are trapezoidal or sectored.

13. The catalyst filling in accordance with claim 12, wherein the plates of the first and second layers are each arranged to form a circular plate ring.

14. The catalyst filling in accordance with claim 13, wherein the inner diameters of the circular plate rings of the first layer and the second layer are different.

15. The catalyst filling in accordance with claim 13, wherein an inner circle of each circular plate ring is filled by at least one central plate.

16. The catalyst filling in accordance with claim 13, wherein the inner diameters of the circular plate rings of the first layer and the second layer are approximately the same.

17. The catalyst filling in accordance with claim 13, wherein a central region defined by the circular plate rings is closed by an end cap.

18. The catalyst filling in accordance with claim 1, further comprising at least one locator and/or position holder that defines the position of the second layer of planar catalyst material with respect to first layer of planar catalyst material disposed thereunder.

* * * * *